United States Patent
Peloso

(10) Patent No.: US 10,916,967 B2
(45) Date of Patent: Feb. 9, 2021

(54) AUDIT METHOD AND SYSTEM AND SUPPLY METHOD AND SYSTEM FOR PV POWER INJECTION AND CONSUMPTION IN A POWER GRID SYSTEM

(71) Applicant: SUN ELECTRIC PTE LTD, Singapore (SG)

(72) Inventor: Matthew Peloso, Singapore (SG)

(73) Assignee: Vikram Kumar, New Delhi (IN)

( * ) Notice: Subject to any disclaimer, the term of this patent is extended or adjusted under 35 U.S.C. 154(b) by 530 days.

(21) Appl. No.: 15/520,904

(22) PCT Filed: Jun. 10, 2015

(86) PCT No.: PCT/SG2015/050152
§ 371 (c)(1),
(2) Date: Apr. 21, 2017

(87) PCT Pub. No.: WO2016/064341
PCT Pub. Date: Apr. 28, 2016

(65) Prior Publication Data
US 2018/0026478 A1    Jan. 25, 2018

(30) Foreign Application Priority Data
Oct. 23, 2014  (SG) .......................... 10201406883 U

(51) Int. Cl.
*H02J 13/00*   (2006.01)
*H02J 3/38*    (2006.01)
(Continued)

(52) U.S. Cl.
CPC ........ *H02J 13/0006* (2013.01); *G05B 19/042* (2013.01); *G06N 7/005* (2013.01);
(Continued)

(58) Field of Classification Search
CPC ........ H02J 13/0006; H02J 3/383; H02J 3/386; H02J 3/28; G06Q 50/06; G06N 7/005
See application file for complete search history.

(56) References Cited

U.S. PATENT DOCUMENTS

| 7,890,436 B2 | 2/2011 | Kremen |
| 2009/0160187 A1 | 6/2009 | Scholte-wassink |

(Continued)

FOREIGN PATENT DOCUMENTS

| CN | 101465552 A | 6/2009 |
| EP | 2072813 | 6/2009 |

(Continued)

OTHER PUBLICATIONS

"European Application No. 15851698.9, Extended European Search Report dated May 3, 2018", (May 3, 2018), 8 pgs.

(Continued)

*Primary Examiner* — Nathan L Laughlin
(74) *Attorney, Agent, or Firm* — Schwegman Lundberg & Woessner, P.A.

(57) ABSTRACT

A method of supplying power in a power grid, a system supplying power in a power grid, a method of consolidating power injection and consumption in a power grid, a system for consolidating power injection and consumption in a power grid, a metering system for a power grid, and a metering method for a power grid. The method of supplying power in a power grid, the method comprises determining an initial forward probabilistic power supply time profile of an aggregate intermittent power source connected to the power grid; determining a target power demand time profile of at least one load connected to the power grid; and associating at least respective portions of the initial forward probabilistic power supply time profile and the target demand time profile such that a probability of supply of power from the (Continued)

intermittent power source to the load meets a specified criterion.

16 Claims, 12 Drawing Sheets

(51) Int. Cl.
    *G05B 19/042*     (2006.01)
    *G06N 7/00*     (2006.01)
    *G06Q 20/10*     (2012.01)
    *G06Q 20/14*     (2012.01)
    *G06Q 50/06*     (2012.01)
    *H02J 3/28*     (2006.01)
    *H02J 3/32*     (2006.01)
    *H02J 3/00*     (2006.01)

(52) U.S. Cl.
    CPC ......... *G06Q 20/102* (2013.01); *G06Q 20/145* (2013.01); *G06Q 50/06* (2013.01); *H02J 3/28* (2013.01); *H02J 3/32* (2013.01); *H02J 3/38* (2013.01); *H02J 3/383* (2013.01); *H02J 3/386* (2013.01); *H02J 13/0086* (2013.01); *G05B 2219/2639* (2013.01); *H02J 3/003* (2020.01); *H02J 2203/20* (2020.01); *Y02B 70/30* (2013.01); *Y02E 10/56* (2013.01); *Y02E 10/76* (2013.01); *Y02E 40/70* (2013.01); *Y02E 60/00* (2013.01); *Y04S 10/12* (2013.01); *Y04S 10/123* (2013.01); *Y04S 20/221* (2013.01); *Y04S 40/20* (2013.01)

(56) References Cited

U.S. PATENT DOCUMENTS

| | | | |
|---|---|---|---|
| 2010/0207448 | A1 | 8/2010 | Cooper et al. |
| 2013/0047010 | A1* | 2/2013 | Massey ................. G06Q 10/06 713/320 |
| 2013/0090935 | A1 | 4/2013 | Uselton |
| 2014/0114829 | A1 | 4/2014 | Forbes, Jr. |
| 2014/0214219 | A1 | 7/2014 | Katayama et al. |
| 2014/0358307 | A1* | 12/2014 | Taniguchi ................. H02J 3/32 700/291 |

FOREIGN PATENT DOCUMENTS

| | | |
|---|---|---|
| EP | 2639919 | 9/2013 |
| JP | 2004012376 A | 1/2004 |
| JP | 2004028924 A | 1/2004 |
| JP | 2005207629 A | 8/2005 |
| JP | 2005219084 A | 8/2005 |
| JP | 2011130584 A | 6/2011 |
| JP | 2012010549 A | 1/2012 |
| JP | 2014039352 A | 2/2014 |
| JP | 2014068426 A | 4/2014 |
| JP | 2014192981 A | 10/2014 |
| JP | 2015163097 A | 9/2015 |
| WO | WO2012136843 A1 | 10/2012 |
| WO | WO2012169879 A2 | 12/2012 |
| WO | WO2014115556 | 7/2014 |

OTHER PUBLICATIONS

Peloso, Matthew, "Method and System for Operating a Plurality of Photovoltaic (PV) Generating Facilities Connected to an Electrical Power Grid Network", Singaporean Application Serial No. 10201502972V, filed Apr. 15, 2015, 32 pgs.

Peloso, Matthew, "Power Grid System and Method of Consolidating Power Injection and Consumption in a Power Grid System", Singaporean Application Sereal No. 10201406883U, filed Oct. 23, 2014, 23 pgs.

SMA Solar Technology AG, "The Self-Consumption Bonus", [online]. Retrieved from the Internet: <URL: http://www.sma.de/en/partners/knowledgebase/ the-self-consumption-bonus.html>, (Jul. 2010), 6 pgs.

Qin, Zhilong, et al., "Incorporating multiple correlations among wind speeds, photovoltaic powers and bus loads in composite system reliability evaluation", *Applied Energy*, vol. 110, (Oct. 2013), 285-294.

Kiong, "Singapore: Asia's Clean Power Growth Frontier" TAGS, 2012, 2 pages.

Google, "Google's Green PPAs: What, How and Why", Google, Sep. 17, 2013, 6 pages.

Lim, "Lighting the Way to Clean Energy with Solar Power", The Business Times, Aug. 22, 2014, 1 page.

\* cited by examiner

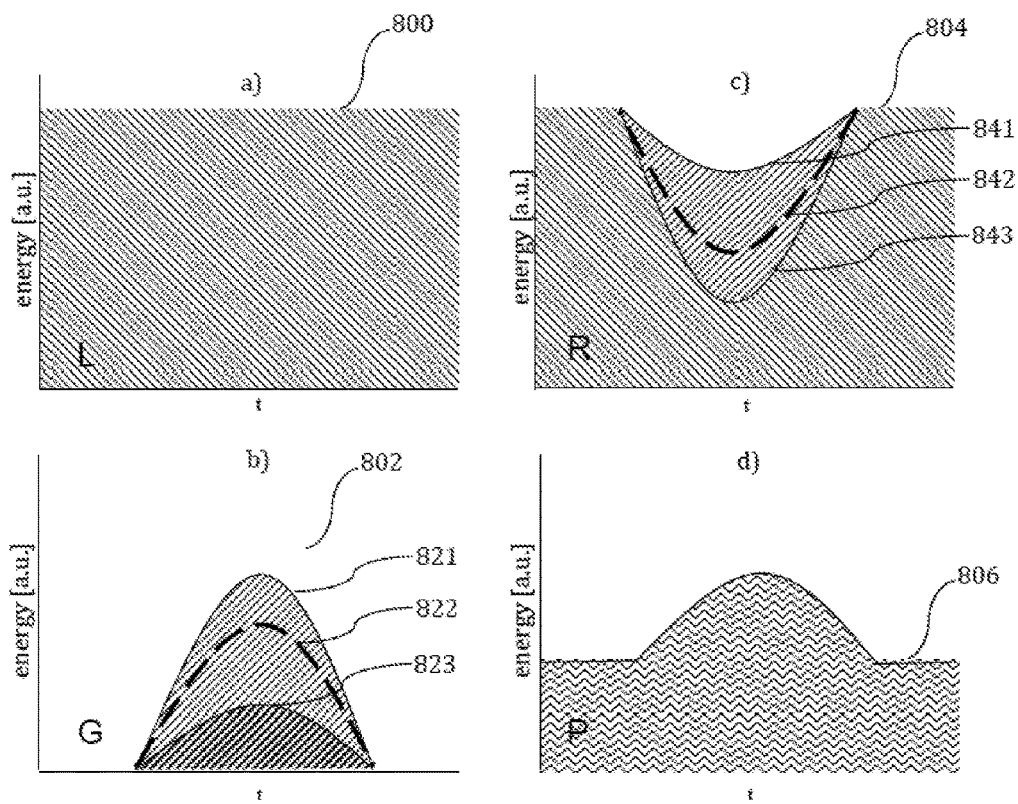
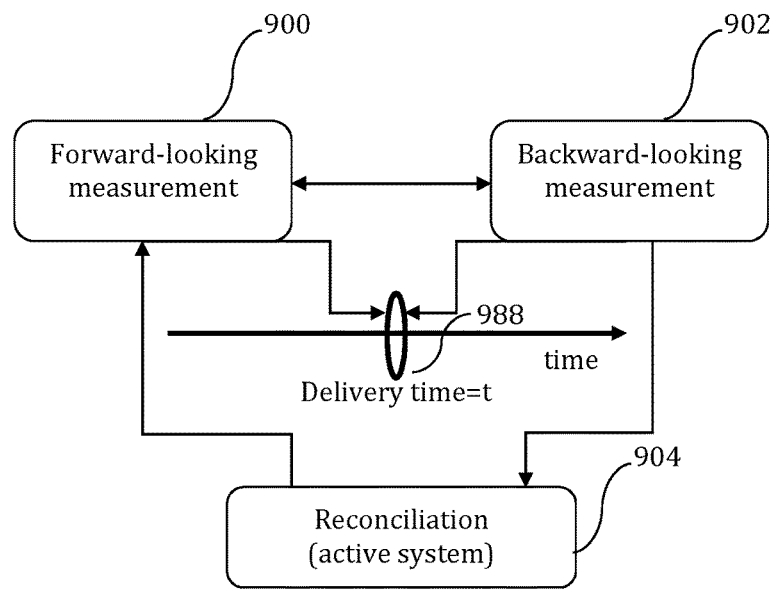
Fig. 8
Fig. 9

AUDIT METHOD AND SYSTEM AND SUPPLY METHOD AND SYSTEM FOR PV POWER INJECTION AND CONSUMPTION IN A POWER GRID SYSTEM

CROSS-REFERENCE TO RELATED APPLICATIONS

This application is the National Stage of International Application No. PCT/SG2015/050152, filed Jun. 10, 2015, which claims the benefit of Singapore application number 10201406883U, filed Oct. 23, 2014, the disclosures of which are incorporated herein by reference in their entireties.

FIELD OF INVENTION

The present invention relates broadly to a method of supplying power in a power grid, a system supplying power in a power grid, a method of consolidating power injection and consumption in a power grid, a system for consolidating power injection and consumption in a power grid, a metering system for a power grid, and a metering method for a power grid.

BACKGROUND

Renewable electricity is becoming a prominent candidate for the supply of electricity to consumers, and certain consumers have different requirements in their desire to obtain renewable electricity products. For example, photovoltaic electricity provides clean energy to consumers which offset carbon dioxide and other toxic emissions when used to replace conventional fossil fuel sources. Photovoltaic generators can be installed behind an energy meter to serve to a specific load, or can be installed to supply into an energy grid or energy pool through connection to the power grid network, or by consolidation methods for settlement of energy in an energy market, for example as described in Singapore patent application no. 10201406883U. This energy can also be supplied through a power network to the consumer. Moreover, an aggregate of various generators can be connected so to supply to a plurality of energy consumers' loads.

One problem in the supply of energy from photovoltaic sources is that the energy is intermittent. The generators cannot be determined to precisely contribute an amount of electricity at any given point in time. As such, supply systems which provide photovoltaic energy to end consumers have been relatively underdeveloped, especially through a grid connected scenario. Exacerbating this problem is that, in most commercial and industrial settings, an embedded generation scenario wherein the photovoltaic system is connected behind the meter of a load is typically inadequate to provide for the renewable energy needs of that load, and cannot be optimized so that the consumer of the renewable energy can establish specific constraints in terms of their required renewable supply constraints such as the total penetration desired to their loads. The constraints on the supply of renewable energy to those consumers in such embedded generation scenarios is only determined from the amount of physical space local to their own load demand (for example a building rooftop) in the "behind-the-meter" schemes.

Another problem in the supply of renewable energy to a load or a group of loads is that, when the renewable energy generators are contributing clean electricity to the end customer loads, those customers would like to determine the amount of renewable energy penetration that is associated with their energy consumption. This can facilitate the adoption of clean energy with energy consumers.

Embodiments of the present invention provide a method of supplying power in a power grid, a system supplying power in a power grid, a method of consolidating power injection and consumption in a power grid, a system for consolidating power injection and consumption in a power grid, a metering system for a power grid, and a metering method for a power grid that seek to address at least one of the above problems.

SUMMARY

In accordance with a first aspect of the present invention there is provided a method of supplying power in a power grid, the method comprising determining an initial forward probabilistic power supply time profile of an aggregate intermittent power source connected to the power grid; determining a target power demand time profile of at least one load connected to the power grid; and associating at least respective portions of the initial forward probabilistic power supply time profile and the target demand time profile such that a probability of supply of power from the intermittent power source to the load meets a specified criterion.

In accordance with a second aspect of the present invention there is provided a system supplying power in a power grid, the system comprising means for determining an initial forward probabilistic power supply time profile of an aggregate intermittent power source connected to the power grid; means for determining a target power demand time profile of at least one load connected to the power grid; and means for associating at least respective portions of the initial forward probabilistic power supply time profile and the target demand time profile such that a probability of supply of power from the intermittent power source to the load meets a specified criterion.

In accordance with a third aspect of the present invention there is provided a method of consolidating power injection and consumption in a power grid, the method comprising determining an actual power supply of an aggregate intermittent power source connected to the power grid at a time; determining an actual power consumption of a load connected to the power grid at the time; associating at least respective portions of the actual power supply and the actual power consumption; and determining an actual intermittent power supply contribution for the load based on the associated respective portions of the actual power supply and the actual power consumption.

In accordance with a fourth aspect of the present invention there is provided a system for consolidating power injection and consumption in a power grid, the system comprising means for determining an actual power supply of an aggregate intermittent power source connected to the power grid at a time; means for determining an actual power consumption of a load connected to the power grid at the time; means for associating at least respective portions of the actual power supply and the actual power consumption; and means for determining an actual intermittent power supply contribution for the load based on the associated respective portions of the actual power supply and the actual power consumption.

In accordance with a fifth aspect of the present invention there is provided a metering system for a power grid comprising means for metering power supply of an aggregate intermittent power source connected to the power grid; means for metering power consumption of a load connected to the power grid at the time; and means for metering an intermittent power supply contribution for the load based on the metered power supply and the metered power consumption.

In accordance with a sixth aspect of the present invention there is provided a metering method for a power grid comprising metering power supply of an aggregate intermittent power source connected to the power grid; metering power consumption of a load connected to the power grid at the time; and metering an intermittent power supply contribution for the load based on the metered power supply and the metered power consumption.

BRIEF DESCRIPTION OF THE DRAWINGS

Embodiments of the invention will be better understood and readily apparent to one of ordinary skill in the art from the following written description, by way of example only, and in conjunction with the drawings, in which:

FIGS. 8 a)-d) show a schematic drawings illustrating the peak energy offset supply scenario wherein the base load energy derived from wholesale energy pool is passed to the consumer and the supply load is decoupled from the wholesale market volatility from correlation to the periods of peak energy demand by supply of photovoltaic energy under an optimized renewable penetration scenario; where a) is assumed load profile, b) is probability density distribution of aggregated generation resources, c) is the modified load profile, and d) is a characteristic wholesale pool profile showing correlation of demand to the intermittent energy resource, according to an example embodiment.

FIG. 9 shows a schematic drawing illustrating the relationship between the supply and audit process wherein the supply projects forward to time t, and the audit looks back to time t, according to an example embodiment.

DETAILED DESCRIPTION OF PREFERRED EMBODIMENTS

Figure 1:
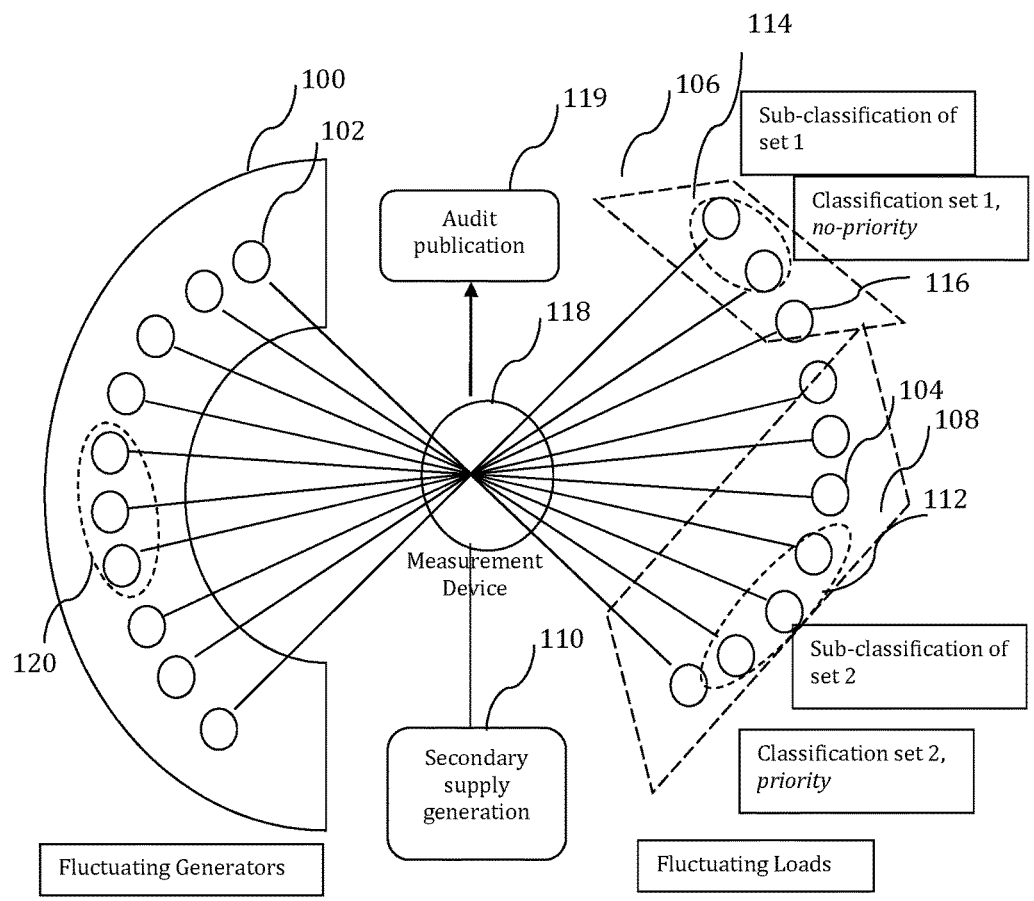
FIG. 1 shows a schematic drawing illustrating a set of intermittent generators of associated statistical generation capacity supplying to a set of loads of associated consumption capacity wherein said loads are classified by their supply constraints, according to an example embodiment.

Embodiments of the present invention provide a system and method for establishing both the energy supply service to provide various options for energy consumers who seek to obtain renewable energy or photovoltaic energy as a part of their energy blend, wherein the various levels of minimum renewable penetrations and other limits can be determined for an energy consumer prior to establishing the measurement of the supply; while in addition, an associated audit methodology solves for presenting on a look back basis those energy consumers with the historical renewable penetration levels of supply so as to confirm those consumers do receive said terms of renewable energy supply.

In a forward looking scenario, a supply method in an example embodiment accounts for the stochastic nature of a set of intermittent energy generators. In a look back scenario, an audit method according to an example embodiment accounts for the actual historical renewable energy penetration levels. In such a scenario, both the supply and audit methods can then be used to establish energy products and associated constraints demanded by consumers in both a forward-looking and backward-looking basis, while establishing an empirical method of measurement to verify these product constraints are being met by the energy utility operating the plurality of intermittent generation facilities.

Example embodiments can meet the consumers need for a method of reviewing the levels of supply and the associated renewable energy levels under an audit that confirms they receive supply under the constraints that they have determined in their supply contracts, and can meet the supplier need a forward-looking supply method that can allocate the aggregated intermittent resources to those consumer loads in a probabilistic manner so that they can provide guarantees and warranties to those consumers that they will be able to meet those constraints required. For this purpose a Probability Distribution Function (PDF) representing the generation resources as well as the loads to be supply can advantageously be determined.

In the following description, generating facilities are assumed to be renewable generators that can provide energy to energy consumers through a power grid. The supply scenario can be assumed to implement an energy pool where energy is put in and taken out to provide for customers. The flow of energy will be indicated by the metering apparatus used to establish individual loads and generators demand and supply, respectively. The consumer loads are assumed to have various constraints or requests in terms of the amounts of intermittent energy that they require to be blended into their loads demand. For example, a consumer may require 100% energy from the intermittent generator, while others only request a particular renewable penetration ratio. It is assumed in the following that the information associated with the loads is made available by the consumers to the electricity supplier when they are requesting their supply contract, and establishing its associated constraints.

The electricity supply operates an aggregates supply system comprising a variety of generating facilities that together form the basis of their generation. The supplier may also obtain additional energy to meet the consumers load demands from a secondary source, such as a energy market pool or a back up generator.

The present specification also discloses apparatus for (herein also referred to as "means for" performing the operations of the methods. Such apparatus may be specially constructed for the required purposes, or may comprise a computing device selectively activated or reconfigured by a computer program stored in the computer. The algorithms and displays presented herein are not inherently related to any particular computer or other apparatus. Various general purpose machines may be used with programs in accordance With the teachings herein. Alternatively, the construction of more specialized apparatus to perform the required method steps may be appropriate. In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein.

Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or Wireless medium such as exemplified in the GSM mobile telephone system. The computer program When loaded and executed on such a general-purpose computer effectively results in an apparatus that implements the steps of the preferred method.

The invention may also be implemented as hardware modules. More particular, in the hardware sense, a module is a functional hardware unit designed for use with other components or modules. For example, a module may be implemented using discrete electronic components, such as for metering power supplied by a generating facility or for metering power consumed by a load, or it can form a portion of an entire electronic circuit such as an Application Specific Integrated Circuit (ASIC). Numerous other possibilities exist. Those skilled in the art will appreciate that the system can also be implemented as a combination of hardware and software modules.

Overview Description of the Figures and Illustrations as Embodiments of the Invention In this section, an overview of each element of the example embodiments of the present invention as represented in the illustrations and drawings is described, where each element is further elaborated on in the proceeding sections.

FIG. 1 shows an illustrated embodiment of information flows and the relationships between the generating facilities 100, or the generating facilities probability density function output profiles; the consumer load profiles 106 and 108, and the consolidation and reconciliation system 118.

Numeral 100 represents the aggregated generating facilities or the associated Probability Distribution Function (PDF) of this generating profile over time which accounts for the aggregated probability of output from individual generating facilities, e.g. 102.

Numeral 102 represents an individual generating facility or the associated individual generating facilities PDF and is accounting for performance factors of the specific generating facility installation including but not limited to shading losses, thermal losses, or electrical specifications of a generating facility 102.

Numeral 104 is a consumer load profile which is classified to have priority access to the generating facilities or associated PDF profiles 100, and numeral 108 is a set of consumer load profiles that are classified to have priority access to solar generation facilities or associated PDF profiles 100 and/or 102, or classified to have priority to a subset of generating facilities, for example subset 120 of generating facilities 100.

Numeral 116 is a consumer load profile which is classified to have no priority access to the generating facilities or associated PDF profiles 100, and numeral 106 is a set of consumer load profiles that are classified to have no priority access to solar generation facilities or associated PDF profiles 100 and/or 102, or classified to have no priority to any subset of generating facilities, for example subset 120 of generating facilities 100. As described, numerals 106, 108, 116, or 104 may each be associated with a PDF characterising the load demand profile and probabilistic demand scenario of the electricity consumer.

Numeral 112 is a sub-classification of consumer load profiles 108 which have priority to solar and at least a second specific constraint requirement representing the amount of exposure and delivery required for association from generating facilities 100 or a subset of generating facilities 120. For example, numeral 112 classification could be all those consumer loads which require a particular level of penetration as measured by the ratio of supply from intermittent generating facilities 100 or 120 to the load consumption of the set of loads of classification 112.

Numeral 114 is a sub-classification of consumer load profiles 108 which have no priority to solar and at least a second specific constraint requirement representing the amount of exposure and delivery required for association from generating facilities 100 or a subset of generating facilities 120. For example, numeral 114 classification could be all those consumer loads which have an optional level of penetration as measured by the ratio of supply from intermittent generating facilities 100 or 120 to the load consumption of the set of loads of classification 112.

Numeral 110 is a secondary supply resource, which may be embodied by, for example, a wholesale or spot energy market, an energy futures market, or physical delivery of electrical power from a secondary generating facility, or could be embodied by energy drawn from an energy storage medium.

Numeral 118 is a consolidation computation module which computes both forward looking supply models and associated probabilities of the expectation values of meeting constraints associated with consumer load classifications 106, 114, 108, or 112; and backward-looking audits and reconciliation methods verifying the associated expectation values of meeting said constraints associated with consumer load classifications 106, 114, 108, or 112 are established through historical measurements, wherein a back-ward looking audit as described within may involve, for example, shifting energy resources 100 or 120 from no-priority consumption loads 106, 116, or 114 to priority consumption loads 108, 112, or 104.

Numeral 119 represents the information provided for publication which may be a presentation of delivery, historical measurements of the consumer load demands of 106, 116, 114, 108, 112, or 104; historical measurements of the generation facilities 100, 102, or 120; or may be ratios and verifications of various constraints as computed at the consolidation module 118. Example embodiments of such a audit publication system may take the form of an Application Programme Interface (API), a mechanism allowing presentation of information to social media, allowance for distribution of information to the internet, or for adaption into a consumer billing system.

FIGS. 2a)-b) illustrate intermittency of associated generating facilities 100, wherein numerals 201, 202, and 203 are individual probability density functions of the electricity output from an individual intermittent supply source, for example, numeral 102 (FIG. 1). In 201, 202, and 203, the vertical axis represents the energy output, while the horizontal axis represents time of day.

Numeral 222 is a embodiment of an aggregate Probability Distribution Function (PDF) characterised by particular output metrics 206, 204, 205, 207, 208, and 209 in an example embodiment. In plot 222, the horizontal axis is time whereas the vertical axis is the expected output in terms of electrical output or energy units associated with a particular probability model associated with metrics 206, 204, or 205.

Here, numeral 207 is a line profile of a continuous PDF representing the maximum output of aggregated generating facilities taken together, wherein numeral 206 is the maximum energy output that would occur in the event of maximum output from a system. Numeral 208 is a line profile of a continuous PDF representing the average output of aggregated generating facilities taken together, wherein numeral 204 is the average energy output that would occur in the event of average output from the aggregated system of generating facilities. Numeral 209 is a line profile of a continuous PDF representing a lower level of output of aggregated generating facilities taken together, wherein numeral 205 is the lower level energy output that would occur in the event of maximum output from a system.

Any of the PDFs 207, 208, or 209 may be represented as discrete probability density models, for example, as an array in a database and can take the form as a forward-looking probability of generation from a generation facility 100, or a subset of generating facilities 120.

Figure 3:
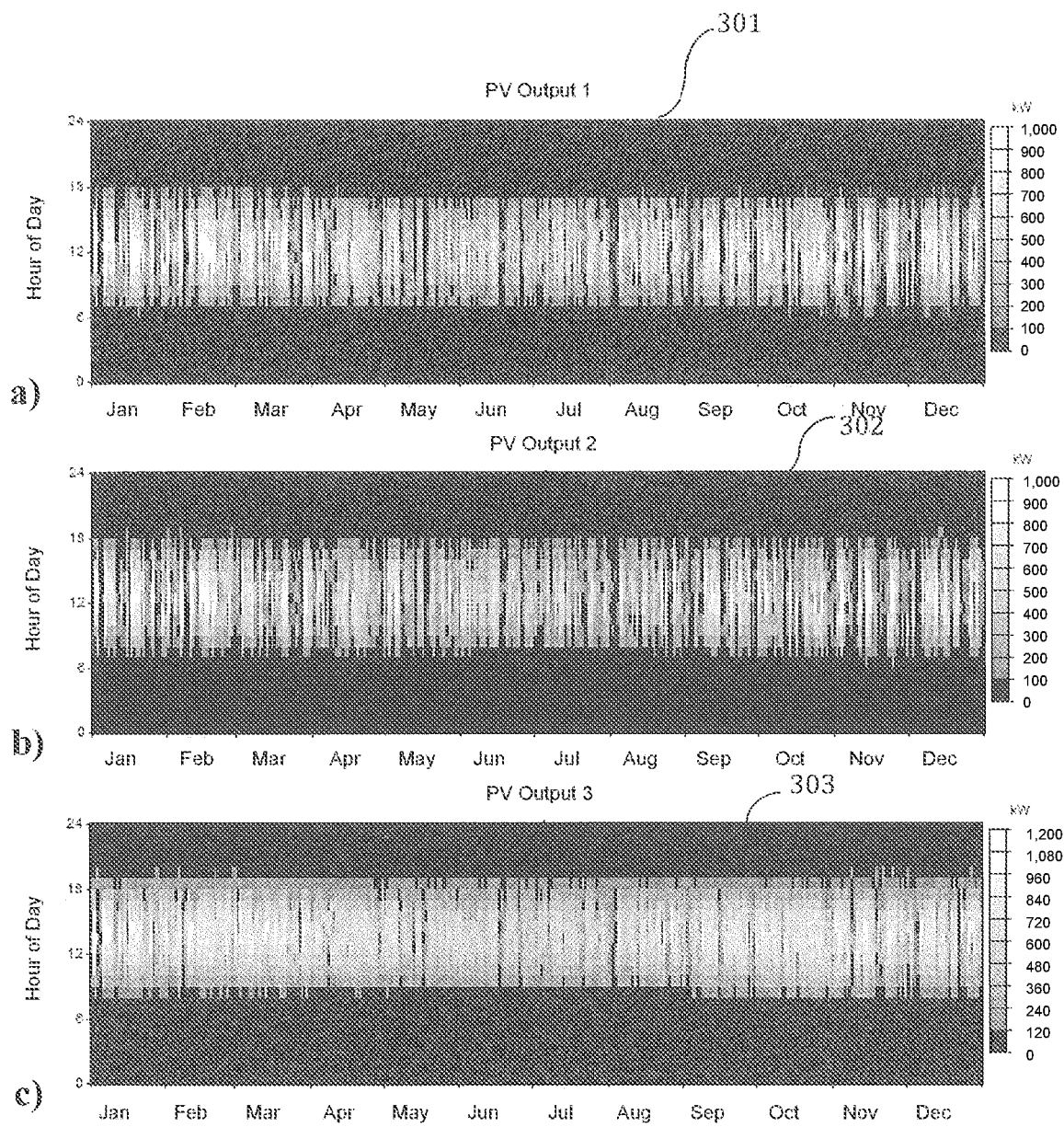
FIGS. 3 a)-c) shows an image demonstrating a measured statistical variation of the annual output of three individual generating facilities connected to the same AC electrical power grid network, wherein the total electrical output is represented by a colour scale, and time is represented with the day plotted horizontally and the time of day plotted vertically, according to an example embodiment.

FIGS. 3 a)-c) illustrate the measured annual output 301, 302, and 303 of three separated energy generating facilities connected to the same AC electrical power grid network, wherein the generation profile may be developed through numerical synthesis of the measured electrical output. The statistical nature or the said generating facilities is apparent by the fluctuations in the plots 301, 302, and 303. In plots 301, 302, and 303 the horizontal axis represents the day of the year, the vertical axis represents the time of the day, and the colour scale in greyscale represents the total energy output in units as reflected in the scale bars at the right of each image.

FIGS. 4a)-d) illustrate characteristics reflecting the probabilistic nature of consumer supply demand such as 106, 114, 116, 104, 108, or 112 (compare FIG. 1), according to example embodiments. Numeral 400 is a probability density of the demand of an aggregated class of consumer loads, while numeral 401 is a continuous line profile representing the level of energy demand of the aggregated class of consumer loads. The continuous line profile may also be presented as a discrete probability model such as a vector array computed in a database.

Numeral 402 is an illustration of a daily load demand profile, herein as a discrete measured set of events, wherein the horizontal axis is the time of day and the vertical axis is the consumer load demand level.

Numeral 406 illustrates the measured annual input of an individual consumer load connected to the same AC electrical power grid network to which generating facilities are interconnected, wherein the demand profile may be developed through numerical synthesis of the measured electrical output. In plot 406 the horizontal axis represents the day of the year, the vertical axis represents the time of the day, and the colour scale in greyscale represents the total energy output in units as reflected in the scale bars at the right of each image.

Numeral 404 illustrates an additional manner in which statistical profiles of the consumer load profile may be assessed quantitatively, wherein a variance as a max, daily high, daily mean, min and daily low are measured and plotted. The horizontal axis of the chart is time while the vertical axis of the chart is the load demand.

Such a profile 402, 404, or 406 may be used to create a synthetic probability model of consumption if required.

The statistical nature or the said consumer load demands is apparent by the fluctuations in the plots 402, 406, and/or 404. Implementing aggregation of various consumer loads to form a PDF of all consumer loads associated with a particular classification may be completed by quantitative evaluation of consumer demands and the associated statistics of them as illustrated within FIG. 3.

Figure 5:
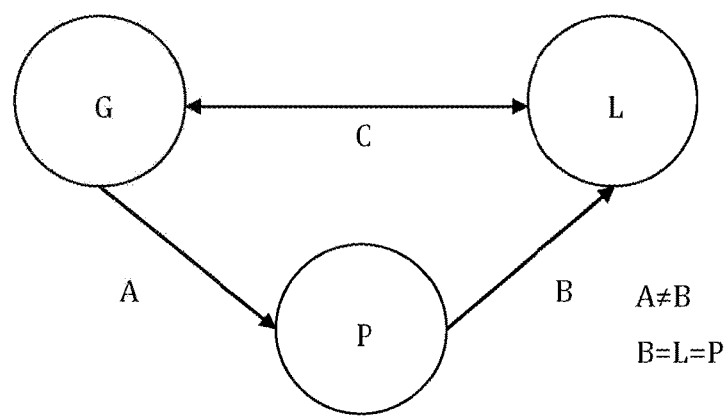
FIG. 5 shows a schematic drawing illustrating the supply of energy through a market pool P from the intermittent generating facilities G to the consumer loads L, according to an example embodiment.

FIG. 5 is an illustration of a model of supply and delivery to a consumer in example embodiments by implementing a intermittent source G along with a secondary source P to fulfil the energy demands of a load L; wherein G may represent a aggregated generating facility 100, a subset of an aggregated generating facility 120, or a individual generating facility 102; and wherein a load L may represent a aggregation of consumer load demand or an aggregation of consumer load demand of a particular classification. P may be assumed to be a wholesale energy market established by the energy flows on a single AC electrical power grid network.

As discussed within, any classification or sub-classification within loads L may be associated with one or more constraints of which must be established both through forward-looking supply expectations as well as backward-looking audit and reconciliation systems to establish all constraints are met as measured.

In an example embodiment, loads L may be supplied through label B via a secondary supply resource P being a wholesale energy pool such that only the load requirements of supply are met but no constraints are established, wherein any constraint as established from generating facility G may be verified by supply to the secondary market P, and associated establishments of the audit and reconciliation through label C determined directly to the loads. As embodied herein, the physically measured flows of energy as represented and recorded as vectors within a database may be indexed in time, and thus matched through to loads L such that all associated constraints of L may be thus audited from generators G.

In this embodiment, L and P may be established to match, while supply through label C may be an offsetting of the load L equivalent to the input via label A. As such, though label A and label B represent to separate levels of supply through to L, the association of physical supply at G and secondary supply at P establish together the requirements in time of L represented only by the demand levels, wherein any constraint must be established through label C between G and L by time indexing generation and loads as a forward-looking probability density, or as a measurement of delivery in a backward-looking audit with reconciliation.

Figure 6:
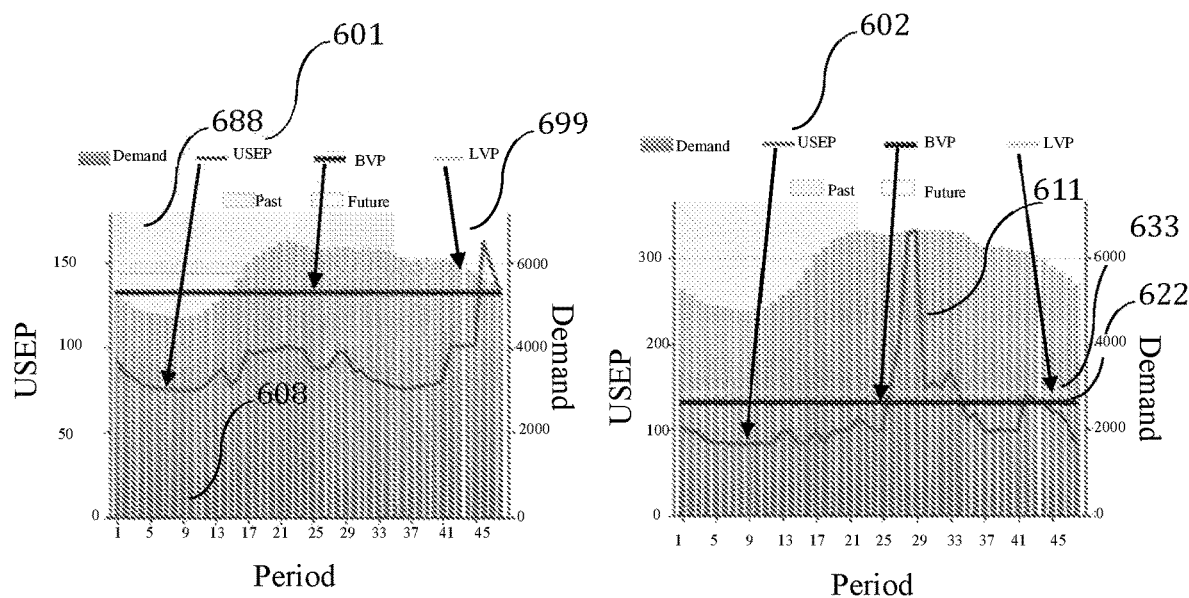
FIG. 6 shows a schematic drawing illustrating the characteristics of a wholesale energy pool on a particular day at a particular time, wherein the wholesale energy pool characteristics determine available resources and constraints of a secondary generation resources, according to an example embodiment.

FIGS. 6 a)-b) illustrates a wholesale energy market by demand level and price, wherein discrete time intervals are apparent. The horizontal axis is time, and the vertical axis displays both demand and price. A forward looking demand is displayed as reflected by the region 699 of the white rectangle as the backdrop of the chart, while a past delivery is displayed as reflected by the region 688 of the grey rectangle as the backdrop of the chart.

Here, three separate pricing reference levels are shown, including a Uniform Electricity Price (USEP) associated with this particular electricity pool market, a Liquefied Natural Gas (LNG) vesting price, and a oil linked contract price BVP. Arrows indicate the USEP, BVP, and LVP lines drawn into the time plot of the wholesale market respectively. Numeral 611 indicates a particular USEP time series as the grey line, numeral 622 indicates the BVP price as a dark line, and numeral 633 is the LVP price as a light grey line. The demand profile can be reflected as the rise and fall of the vertical bar chart component 608. Both charts exhibit a daily increase in demand correlated with periods of the middle of the day. This profile which occurs time to time is implemented as a secondary resource as described in example embodiments of this document.

Figure 7:
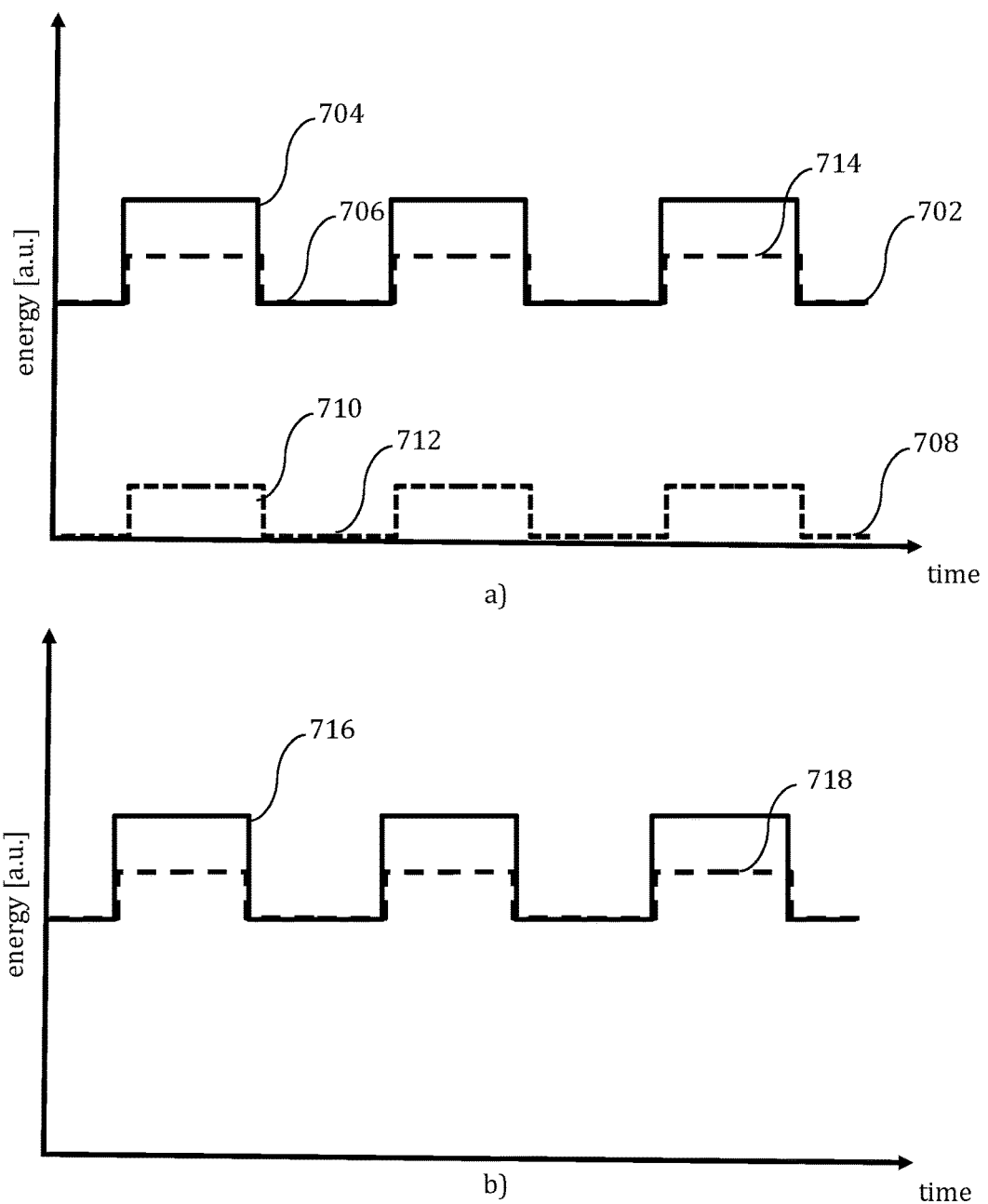
FIGS. 7 a) and b) show schematic drawings showing the process of implementation of an offset for a case of a flat percentage of energy and associated secondary generation supply to a load, according to an example embodiment.

FIGS. 7 a)-b) illustrate a method of offsetting energy as presented in patent number 10201406883U add intermittent supply patent idea] where a correlation from a generating facility is used to reshape a load Curve 708 schematically shows the PV power generation profile from the PV power generator during the specified period. As will be appreciated by the person skilled in the art, the power generation peaks e.g. 710 coincide with the day time, while essentially no power is generated during the night time e.g. 712. That is, the generation profile 708 and the consumption profile 702 of the chosen source/load pair (or pairs) are preferably matched. Such a matching criterion may be associated with a quantitative correlation coefficient between the secondary supply as in a wholesale energy market and the consumer load demand.

Curve 714 schematically shows the portion of the power consumption that will be met by supply from a mains grid portion through a secondary supply source, for example, from wholesale markets or another energy generator. As can be seen from a comparison of curves 702 and 714, the amount of power that needs to be met during the peak periods e.g. 704 is reduced accordingly.

If the consumer can anticipate a lower peak demand due to the supplemental power supply from the PV power generator, then the risk profile considered by the retailer will be "reduced", corresponding to the flattened supply profile represented by curve 714. Thus, the supply model to such a consumer load has a reduce exposure to the secondary source and as correlated to the demand period of lower availability of resources on the power grid network. This benefit is extended to a load or loads of specific characteristics being supplied to via the power grid. In FIG. 7b), curves 716 and 718 schematically show the required supply needed from other sources/the contestable retailer without and with the PV power generator capacity offset respectively.

FIGS. 8 a)-d) illustrate four representative time profiles according to example embodiments which show a hypothetical load L at numeral 800, a hypothetical generation profile G at numeral 802, a hypothetical secondary energy market as a pool P at numeral 806, and a derived load shape function accounting for supply from both G and P. In the plots, the horizontal axis is time and the vertical axis is energy capacity. Energy capacity may either be generation capacity for G at 802, demand capacity for L at 800, demand capacity for R at 804, or relative market supply/demand availability for P at 806.

Figure 2:
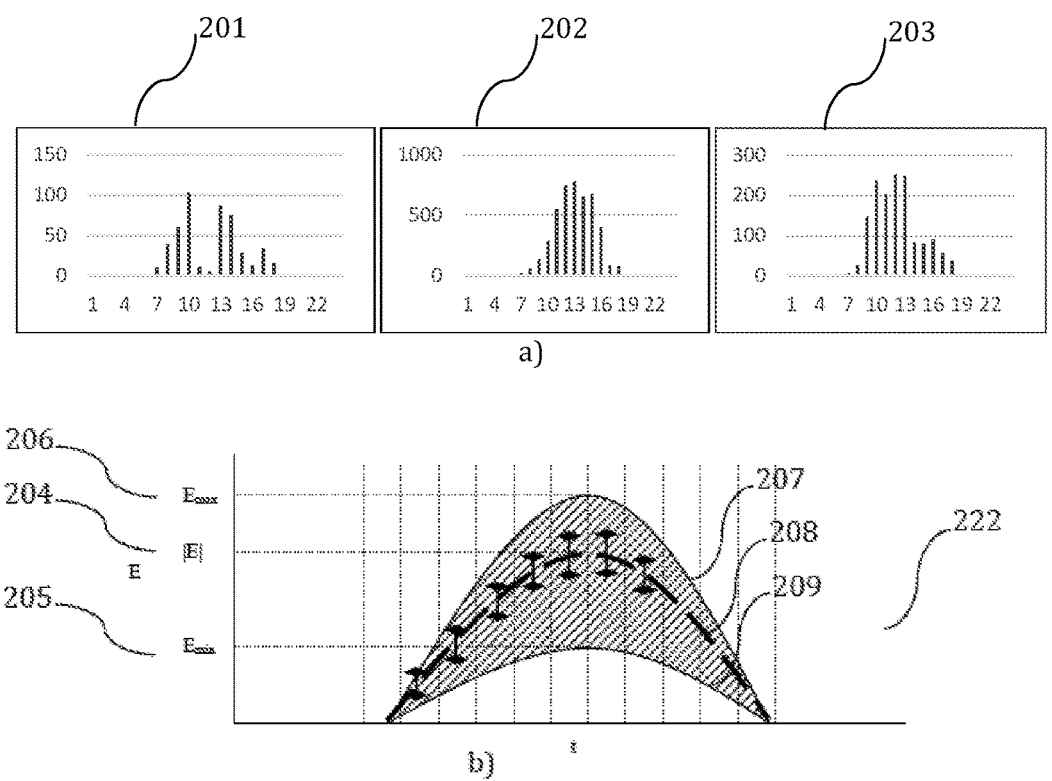
FIGS. 2 a) and b) show schematic drawings illustrating the evaluation of a statistically intermittent supply profile, according to an example embodiment.

Numerals 821, 822, and 823 reflect three assumed probability generation profiles similarly reflected in FIG. 2 by numerals 207, 208, and 209. Such generation profiles may be assumed to be derived from generating facilities 100, or a subset of generating facilities 120. A forward looking supply profile at 802 can account for the various probability assumptions such as a maximum output 821, a lower level of output 823, or a more likely average output profile 822.

Forward looking probability profiles at G 802 are assumed to supply to load profile 800 meeting any specified constraints if required, wherein a secondary load exposure R at 804 may be formed. This secondary load exposure 804 is formed considering various profiles of generation 821, 822, or 823 to result in various secondary load exposures of 841, 842 or 843 respectively. Various kinds of probabilities can be assumed when generating a load profile. As such, the resultant exposure of the secondary load R at 804 to the secondary generation source P at 806 can be formed.

Utilising 802, 804, or 806, various kinds of correlations may also be determined between profiles 800, 802, and 806 by derivation of 804 through adjustment of 802. An adjustment at 802 can be performed through allocation of resources from generating facilities 100 into priority resources as a subset of generating facilities 120.

Physical resources from 100 that are allocated into a subset 120 can be optimised based on a quantitative correlation to the wholesale pool P at numeral 806 where a wholesale market is available for transacting for secondary energy supplies.

By utilising a wholesale pool, and a system as shown in FIG. 5 for implementing supply from a intermittent generating facility and a wholesale pool, the problem of allocation of a plurality of intermittent resources to a particular load profile 800 can be solved. Moreover, using the above mechanisms that create time profiles as Probability Density Functions (PDFs), forward looking probability models, quantitative correlations between a load demand, a generating profile of intermittent resources, and a wholesale pool or other secondary supply resource (such as a second generator set) can be formed.

FIG. 8 forms the basis of which PDFs can be utilised reflecting various resources and consumer load demands as time profiles, wherein quantitative derivations such as time correlations, or specific consumer constraints reflecting requirements of particular amounts of generation G to load L to complete a resized secondary load demand R can be implemented. These same PDFs are studied on a look-back audit as described further in FIG. 9.

FIG. 9 illustrates the temporal relationship of the supply 900, audit 902, and reconciliation 904 procedures with respect to a delivery of power to match a set of consumer load constraints at time 988, according to example embodiments. Prior to time of delivery 988, a forward-looking Probability Density Function (PDF) profile is established as a discrete vector in a database array (or alternatively as continuous algebraic PDF) of both the loads and the generation from generating facilities, and an expectation value of establishing at least a consumer load constraint is evaluated and the level of resources 120 from generating facilities 100 is allocated such that a high enough probability of expectation is found. The level of expectation can be set by requirements of a local administrator, governor, or internal risk management policies, or by the terms or conditions requested from the consumers.

Post-delivery, a backward-looking audit utilising actual measured results of the given loads and generators in a vector array of a database or evaluated, wherein said constraint or constraints are tested. Wherein a shortfall of any constrain occurs, reconciliation is performed, and resources allocated to low priority consumers receive less energy from generating facilities until all of such shortfall is made up for. In the event of a shortfall, said resources 120 are thus re-established such that an expectation value may be made to be high enough.

Reconciliation may account for various circumstances, and an operation can adjust the resources 120 established to meet priority constraints considering the various ranges of supply from generating facilities that can be made available as presented in FIG. 2. For example, where a minimum level of delivery is assumed during resource allocation to said constraints as per probability model 209, it is less likely that the outcome of the expectation of meeting such constraints would be false. Alternatively, a operator of the solar utility who wishes to be less conservative may assume a probability model 208 or 207 which have varying degrees of which the required constrain may not be satisfied. The probability model assumes will impact in the frequency of the requirements of providing a reconciliation exercise in practise.

Figure 10:
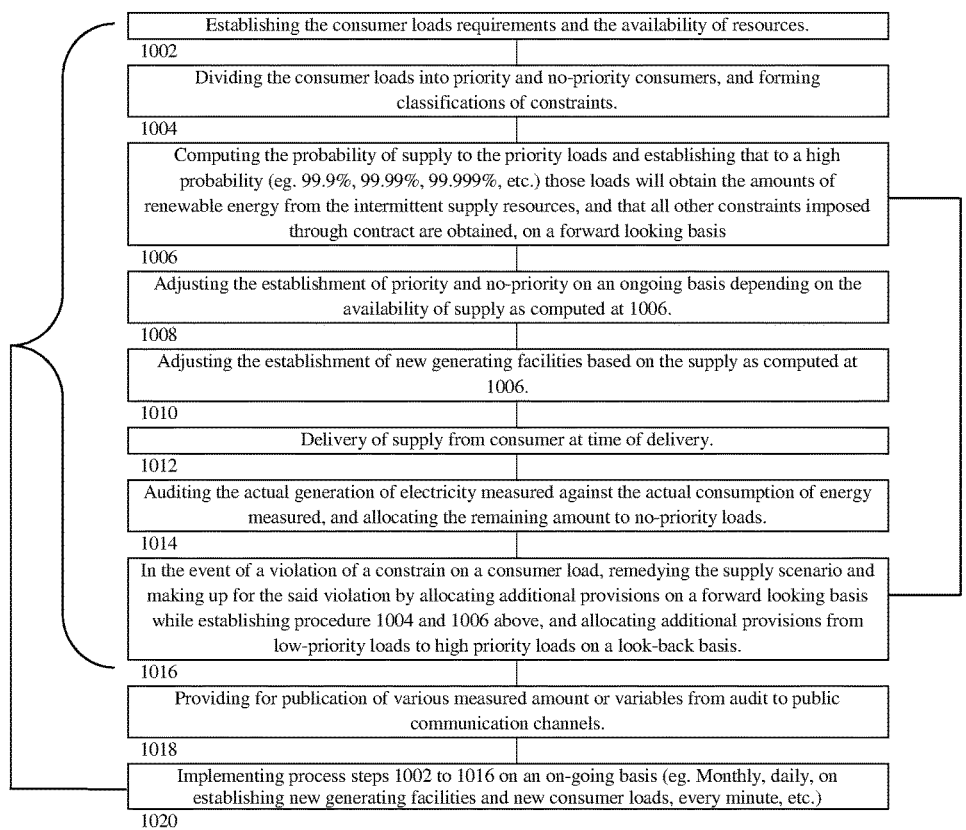
FIG. 10 shows a schematic drawing showing the process flow chart for associated supply and audit methodology, according to an example embodiment.

FIG. 10 illustrates a process flow 1000 of the procedure herein described of forming a supply scenario to match consumer load constraints from a plurality of intermittent generating facilities and a secondary supply facility such as a wholesale market, electricity futures market, or a secondary generator. In this process, a broad classification of priority consumers and no-priority consumers is stated at 1006, while the balance of matching supply constraints on a forward-looking basis is buffered by some allowance for a certain amount of reconciliation. During reconciliation, resources allocated to no-priority loads are utilised to make up for shortfalls in the event that a look-back audit establishes that an event involving a shortfall of a consumer constraint has occurred.

The process involves establishing the consumer load constraints/requirements at 1002 wherein consumer constraints form a classification set or classification sets, and the consumer load PDFs are then derived and associated within various sets which are embodied by the particular constrain or constraints requested. At 1004, the availability of resources is evaluated, including a plurality of intermittent generating facilities and a secondary supply facility. At 1006 consumer loads may then be divided into the priority and no-priority consumption loads. Process element 1006 may occur before or after or in parallel to process element 1004.

Process element 1004 involves deriving the PDF of generating facilities, and computing a expectation value of an outcome of various constraints as formed from process step 1002 by utilising assumed probability models.

Herein, a resource allocation can be formed which allows certain consumer constraints evaluated at process step 1012 to be provided by dedicated priority resources.

At process element 1008, consumer load constraints as established at 1002 may be adjusted, for example, by offering a different product package of a particular constrain to consumers, such that an expectation value of an outcome representing a particular constraint is higher or lower depending on the choice of the utility. At process element 1010, additional generating facilities may be optionally built according to the results of process 1004, 1012, and reconciliation stage 1016

At process stage 1012, expectation values of the probability of supplying to all constraints of loads are evaluated by computing the expectation value in a forward-looking basis accounting for provision of one or more constraints as associated with the PDF of the load demand profile assumed and the PDF of generating facilities allocated to meet those constraints.

At process element 1014, based on the resultant supply that is detected to be measured and delivered at the time of settlement of energy flows (for example, as associated continuously or in particular time intervals of trade), remaining amounts of energy of the generating facilities is then allocated to no-priority loads assuming a particular quantitative model. For example, the energy may be divided by the number of loads and provided then to each load as a same amount, or may be computed as a percentage of supply to the consumers' total capacity of consumption and provided to the loads on an equal percentage basis.

At process element 1014, reconciliation of any shortfalls is applied, wherein based on a measurement, in the event of a shortfall or violation of a constraint to a consumer load, energy derived from resources that was unallocated to priority consumers is provided to make up shortfalls until no shortfalls occur. If there is not enough energy measured to make up for shortfalls, the information flows back to process element 1004 where resources allocated to meet constraints may be adjusted, or additional resources may be built. In process element 1014, if no violation occurs, no reconciliation is applied.

In process element 1016, publication of results of measurements, expectation values, results of audits, or results of reconciliation is enabled either by active publication of the utility or service provider operating the generating facilities and/or supplying the loads, or by allowing the consumers to access the information and publish the results. Publication may go to the world wide web, through the internet, and can be done so that information can be automatically presented based on a schedule or based on establishing specific communication channels and account platforms on websites; for example, on social media, or through post of results to a particular location on a website.

In process element 1020, information flows from each of the process steps can be associated with the balance of establishing new generating facilities, providing and guaranteeing consumer load constraints, or balancing the amount of priority and no-priority account such that the frequency of reconciliation requirements are adjusted.

Figure 11:
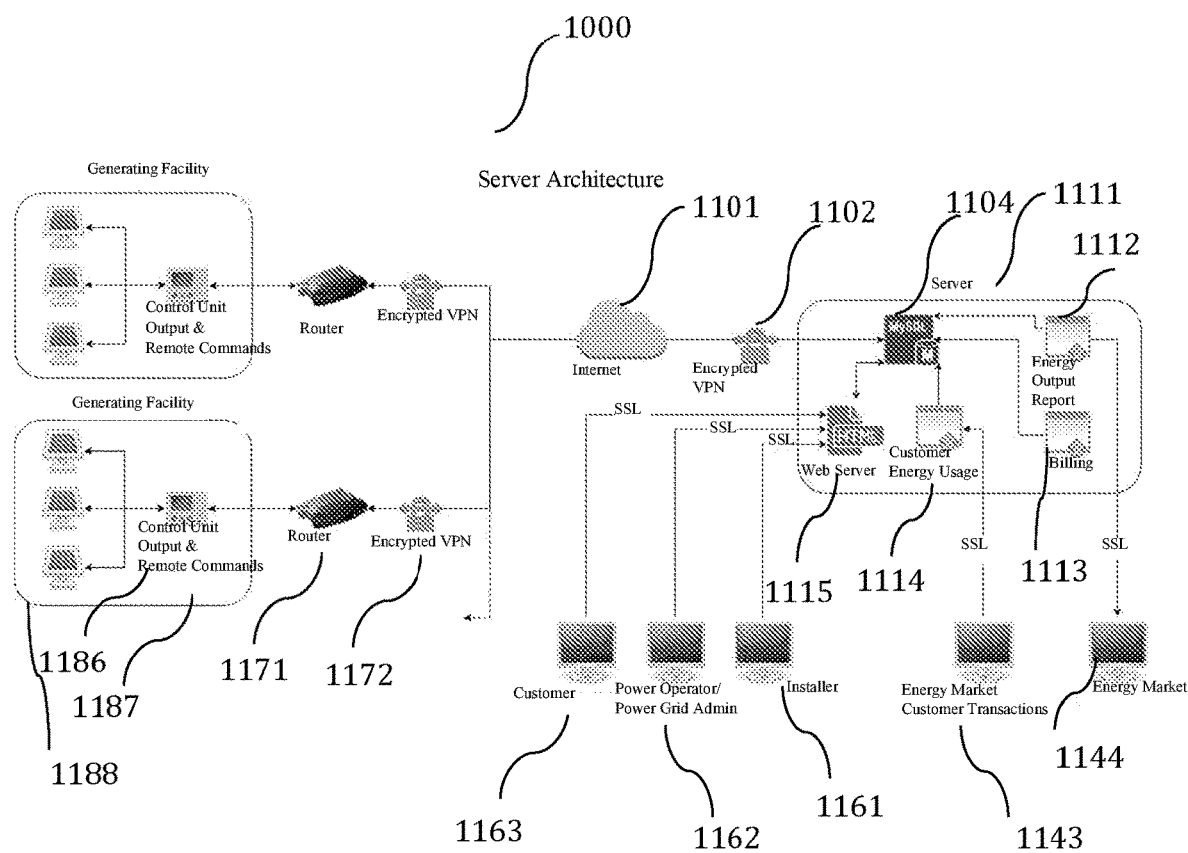
FIG. 11 is an architectural illustration of a representative construction of the information technology system, according to an example embodiment.

FIG. 11 illustrates an example embodiment of architecture of information technology systems used to implement said supply, audit, and reconciliation models. Numeral 1188 is an individual generating facility with associated electrical systems 1186 embodied here by a control interface, and associated revenue grade power meters and communication networking apparatus (not shown). The control unit 1186 is connected through Ethernet to a Router 1171. The Wide Area Network (WAN) port of the Router 1171 will be connected to a local Internet provider (not shown) which will give the router access to the Internet 1101. The router 1171 connects to the server 1111 using a built-in encrypted Virtual Private Network (VPN) connection 1172 and 1102. All communication packets between the Router 1171 and the server 1111 will be encrypted while travelling through the Internet 1101.

Numeral 1111 comprise various units including a database 1104, which for example could be a MySQL database; a web server 1115 to display a user interface for data with respect to the generating facilities 1187; a customer energy usage application 1114 to oversee customer transactions and customer energy usage; a billing application 1113 to generate and send billing information; and an energy output application 1112 to send reports on the energy generated by operational generating facilities.

Numeral 1161 illustrates a solar generating facility installation technician connect to the web server 1115 of the operating platform over the Internet using a web browser on an encrypted Secure Sockets Layer (SSL) connection.

Numeral 1162 illustrates a Power Operator or Power Grid Administrator connect to the web server 1115 over the Internet 1101 using a web browser on an encrypted Secure Sockets Layer (SSL) connection.

Numeral 1163 illustrates an energy customer connect to the web server 1115 over the Internet 1101 using a web browser on an encrypted Secure Sockets Layer (SSL) connection.

Numeral 1143 illustrated a system associated with the energy market transactions which handles customer transactions connected to our server over the Internet 1101 using an encrypted connection such as Secure Sockets Layer (SSL).

Numeral 1144 illustrate a system associated with the energy market which handles energy generation monitoring connected to the server 1115 over the internet 1101 using an encrypted connection such as Secure Sockets Layer (SSL).

Statistical Methods for Modeling Projected Generation Capacity and Probability of Distribution of Generation Capacity to Load Capacity The implementation of the supply scenario for distribution of generated photovoltaic's in an example embodiment involves a system implementing both a statistical approach to project forward the total resources available for supply to a particular load, and an external variable resource that can be implemented to project forward the total resources available for supply to a particular load. A consolidation module 101 (see FIG. 1) can assist in allocating aggregated resources from a plurality of generating facilities to the associated supply loads of consumers, and establish the associated probability of meeting the characteristics of the supply loads that are provided to the consumers. A measurement system can compare the actual generation on a real time basis and compute the actual supply of energy from the associated generating facilities so as to audit the blend of the energy provided to a particular load including from aggregated renewable energy facilities. A remaining amount of energy can then be distributed and represented under audit on the consumer loads with no priority to renewable energy. Finally, for incidences in which a shortfall in energy has occurred, and reconciliation is required, a reconciliation process can be implemented to make up the shortfall to the priority accounts and potentially to modify the constraints on the supply terms to the loads on a forward looking basis.

FIG. 1 shows a set 100 of generating facilities e.g. 102, each of various capacities, locations, electrical connection systems, and other information which could generally comprise all of the technical specifications of the installed energy system, and each having its own statistical output defined from its own specification as well as the variable external information that can be measured or that can be projected on a forward basis. The external data can be obtained as well and regression can be performed to establish all historical statistical variables of such external information on a look back basis. This includes the generation time profile divided into time bins, the mean, mode, median, and other relevant statistical variables.

FIG. 1 also shows a plurality of consumer loads e.g. 104 divided into differing classifications e.g. 106, 108. The various classifications 106, 108 can be associated with characteristics of sets of consumer requirements as specified in their supply agreements, and may be of the form of guaranteed minimum renewable energy requirements of the consumers. The consumers equally may be associated into their own demand profiles showing the total consumption capacity of their loads to be supplied to. Supply arrangements for the consumers comprise energy from the intermittent generating facilities 100, and energy from a secondary source 110. For example, the secondary source 110 may comprise a wholesale energy pool or one or more combustion generators running on fuel.

As a matter of setting the analysis so that the relevant constraints on the supply terms to the loads e.g. 104 can be validated, the first step in the process can be to form the probabilistic distribution representing generation capacity over time, the probabilistic distribution representing energy demand over time, and a division of the distribution of probabilistic demand into the relevant classifications of which will each individually can be validated against a specific set probability.

Division of Supply Loads Into Priority Access and Penetration Levels

FIG. 1 shows the division of supply of the consumer loads e.g. 104 into two particular example classifications 106, 108, among other classifications e.g. 112, 114 represented internally to the initial division classification 106, 108. The upper level classification 106, 108 is used to form a division of the generating facilities 100 energy across the energy consumers' loads demands. The classification 108 in this embodiment is of those consumers' loads e.g. 104 who have priority to the energy derived from the generating facilities 100, against those consumers' loads e.g. 116 in the classification 106 that have no priority to the energy derived from the generating facilities 100. Priority here means, for example, that the consumers require a minimum amount of energy blended into their supply and as such, a portion of the energy from the generation facilities 100 is to be set aside to satisfy the particular constraint of that load demand. For any individual classification e.g. 114 within priority, the validation considers that the total demands of that set 114 must be performed considering all loads e.g. 104 under priority classification 108 against all generating facilities 100 considering all generating facilities that are online at the time of supply evaluation.

Assuming these generating facilities 100 are providing clean renewable electricity, for example as obtained from an intermittent photovoltaic generator, this priority classification 108 refers to the consumers who require a minimum amount of renewable electricity as may be specified in terms of different parameters (for example, as the renewable penetration ratio, the percentage minimum solar energy available, etc. as will be described in more detail below) and the no-priority classification 106 of consumers who do not require a minimum amount of renewable electricity. Classification parameters can include the renewable penetration ratio, the fraction of clean energy blended to a load, the amount of clean energy allocated into a particular time bin, a minimum numerical value in terms of a specific amount of clean energy in a given day, month, or year (e.g. "at least 10 MWh clean energy per year"), or can also be described as a correlation value associating the blend of energy obtained from the renewable energy resource against the fluctuations in demand in the secondary energy market which refers to the supply and demand characteristic in that energy pool.

Consumer loads e.g. 104 are thus divided to express the constraints associated with the supply to those loads.

Under the supply allocation mechanism in an example embodiment, the total intermittent generation capacity that will be available at the period of supply is simulated, modeled, or otherwise derived statistically. The total generation profile is then allocated to the projected consumer loads' e.g. 104 demands in a manner in which all of the constraints of the priority loads e.g. 104 are first met.

In one example, the supply demand is analyzed such that the individual loads are evaluated based on their own total demand profiles, then divided into two broad classifications. The broad classification refers to consumer load demand of priority to the intermittent renewable resources and consumer load demand with no priority to the intermittent renewable resources. Sub classifications can then be identified within the classifications. The total probabilistic demand of each sub-classification is then formed and the constraint or constraints associated to those loads is formed. A statistical validation of each supply constraint is then computed accounting for all the subsets of constraints and the probabilistic aggregated generation facilities generation distribution profile.

The remainder of the process in terms of supply contracts and reconciliation in different embodiments will be described below.

Satisfying the Allocation of Aggregated Intermittent Generation to Associated Load Demand The classification of the consumers' priority forms the principle division of consumer loads e.g. 104 for association with generating facilities 100 wherein an excess of any remaining energy supplied by the generating facilities 100 over the priority constraints of the prioritized consumer loads e.g. 104 is supplied to the loads with no priority e.g. 116. Those priority loads e.g. 104 form hard constraints against which the electricity supply must achieve at least a minimum level. As such, the determined forward looking probability density profile or other quantitative factor (such as for example, done via Monte-Carlo simulation) which represents the total energy available through the aggregated generating facilities is prioritized to meet the multiple constraints posed by the consumer load requirements and embodied in the probability density function of the consumer loads within the particular sets.

Any remaining generation capacity of the intermittent generating facilities 100 may be then allocated to the loads e.g. 116 which have no priority access to those generating facilities 100 or for use during the backward looking audit during the reconciliation process described in more detail within. This can be done on a backward looking basis where an audit 118 of the actual loads' demands and actual supply from the intermittent resources is measured, and the constraints are verified. In addition, during the backward looking audit, any shortfall in meeting the constraints can be made up for by providing any remaining resource to make up for those short falls.

The remaining power after the reconciliation procedure that is measured is blended to the loads e.g. 116 of no priority. This energy can be blended into the loads e.g. 116 of no priority in a number of different ways. For example, the total aggregated demand of all of the loads e.g. 116 with no priority may be established, and the remaining energy allocated to those loads e.g. 116 to reflect a particular constraint as a renewable penetration level to those loads e.g. 116. This will comprise an amount of energy that is delivered to the loads e.g. 116 in comparison to the maximum energy demand periods of the loads. Alternatively, the energy can be divided by the total loads without regard to the amount of energy consumed by that load. In this manner, each load would obtain the same amount of renewable energy, but would individually have a different percentage blend of renewable energy within the individual load consumption.

For facilitation of this above process, FIG. 2 shows an embodiment of the formation of a probability density function of the aggregation of all generating facilities supplying intermittent energy. FIG. 2 a) illustrates outputs from individual generating facilities 201-203 within a single day. Each of the illustrations shows that the output on any given day may show various characteristics. The data is presented in discrete time bins in this example. A combination of such systems can lead to the probability density distribution function (PDF), an example of which is illustrated in FIG. 2 b).

FIG. 2 b) illustrates that for an aggregated energy generation profile, the final PDF 222 can be associated with three key levels 203-205. The PDF 222 can represent the output over various time periods. For example, yearly, monthly, daily, etc. As the time period decreases the PDF 222 will display a more variable distribution profile, while as the time variable is lengthened it will converge to the average PDF (curve 208). The PDF 222 also can be determined using continuous variables, or can be determined using discrete variables. When an energy market operates assuming a particular time bin during which an exchange is made, the discrete time intervals may be assessed assuming this time bin. The PDF 222 can display a minimum level 205 which can be assessed assuming the lower level of output within a particular time period, as well as a maximum level 203 which is the constrained total power output associated with the generating facilities during times in which the renewable energy resource is maximized and the optimal output of the power system is assumed. This maximum output level 203 can also be assumed to account for the power system degradation over the years during which it is operated.

When a supply constraint is assessed, it may be assessed against all of the maximum, minimum, and average PDFs, see curves 207, 209 and 208 respectively. This allows the utility to evaluate a number of additional quantities which can be used when implementing the reconciliation exercise during the backward-looking audit process. The utility can evaluate, for example, the amount of energy that can be provided to the no-priority loads in all of the average and maximum scenarios, and can attempt to set the provisions for allocation of energy to the no-priority loads to a low level under the assumption of the minimum PDF 209. Or, the utility can assume that they would more frequently need to provide for energy blending in a backward looking reconciliation exercise by raising the provision for blending of energy to the no-priority loads closer to the average PDF 208.

In this latter scenario, the shortfalls that occur in the priority loads occur closest to the average PDF 208 determination rather than the minimum PDF 209 determination. Using this process, the utility is prepared quantitatively to provide both guarantees of the supply constraints to the consumer load demands, and an auditing method and reconciliation method such that there is limited probability that a constraint to the loads is not met.

As a summary, the constraints which are to be supplied in regard to a quantitative determination of an amount of intermittent energy provided to a consumer load profile is evaluated by preparing the PDF 222 of the generating facilities and examining the PDF 222 at various scenario levels, then allocating resources from the generators to provide to specific sets of constraints in parallel to each other. The constraints are assessed against the real measurements upon which a backward-looking audit is performed, and reconciliation of any shortfalls is performed. The audit may then be published so that the consumers obtain certainty in regard to the provisions of intermittent renewable energy that they have obtained from the utility based on their specific requirements.

Those consumers who have requested no constraints are considered to have no priority to the intermittent resources, and can obtain an amount of energy that is associated with the remaining energy upon completion of the backward-looking auditing procedure and the backward-looking reconciliation procedure.

Statistical Basis of Supply From Aggregated Generating Facilities to Form Probabilistic Generation Capacity To determine the PDF 222 of the aggregated generating facilities, the Performance Ratio (PR) can be used which represents the output and the electrical performance of an individual generating facility. The generating facilities are associated with all of the specifications of the installation, including the electrical parameters of all of the material components and devices comprising the installation. In addition, the local factors can be considered. For example, an installation which is located near to an obstruction will have a particular shading loss at a time of day. This generating facility will be known to have a different output PDF individually, and as such, the final PDF 222 of the aggregated generating facilities will be the PDF 222 that is the normalized integral of all individual generating facilities accounting for their specific performance criterion. A good resource which presents the design parameters, specifications, and other performance metrics is Antonio Luque (Ed.) and Steven Hegedus (Co-Ed.), Handbook of Photovoltaic Science and Engineering $2^{nd}$ Edition, Wiley 2011 (ISBN: 978-0-470-72169-8)]. We will discuss herein some of the relevant points that can be used to determine the individual PDFs for a specific site, wherein the PDF 222 of the entire aggregated generating facilities can then be more accurately formulated.

The time of turn on or commissioning of a new generating facility can be accounted for in the determination of the PDF of the generating facilities. For example, the known period of construction of a new generating facility, along with the associated loss factors, local performance metrics, and electrical specifications of the installation can allow the utility to formulate the output of this generating facility over a long time period. Its PDF can be assumed to be added into the aggregated generating facilities PDF 222 at a future time. Once that system is constructed and outputting energy through its energy meter, it can be considered to be providing to the aggregated generating facility as a resource starting at the time of turn on. The degradation of these new generating facilities that are turned on will be evaluated starting from the date of commissioning and going forward. The generating facilities can also account for the warranties of the energy systems as well, so that a minimum level of failure can be quantified based on the warranties. For example, a solar panel warranty normally assumes a minimum amount of yearly degradation and otherwise the components can be replaced.

FIG. 2 *a*) shows respective measured outputs 201-203 from respective single generating facilities. As can be seen, at particular times the output of such intermittent generating facilities is limited, while the average output is classified by a correlation to an external variable (for example, the amount of sunlight at the system location).

The generating facility can also be characterized by a maximum output from the generating facility based on the capacity of the particular generating facility.

FIGS. 3 *a*)-*c*) show three separate measurements 301-303 representing the output of three individual generating facilities connected to the same power grid network. As can be seen, intermittency of the generating of energy is observed by the variance in the output of electricity measured at the inverters of the system. The horizontal axis of the plots represents the day in a single year and the data spans one year. The vertical axis represents the hour in the day and spans 24 hours. The output of the individual systems is represented by the grayscale scale bars.

The PDF of the aggregated generating facility or of the allocation of the generating facilities that is set aside to cover particular supply load constraints can be assessed with particular time intervals. The market time interval may define an interval during which trading and settlement is done. The PDF can thus be formulated using the same interval as used in the specific market such that the trading and settlement of energy can be accurately reflected as probabilities reflecting those market cash flows.

A PDF can be generated to reflect the time of day thermal loss evaluation of the site, and a time of day shading loss evaluation. These two factors will provide an accurate representation of the total output of a specific generating facility. The time of day then among all the generating facilities would then be one manner in which all of the individual PDFs of the generating facilities can be computed into a PDF of the aggregated generating facility.

Statistical Basis of Consumer Supply Loads to Form Probabilistic Demand Capacity A PDF of the consumer loads is similarly formulated so that the consumer load demands may be computed.

However, those consumer loads demand can also be sorted into classification based on the constraints that the consumers request to be satisfied and guaranteed in their supply contracts. Consumer load can be determined by looking at the past historical energy consumption of the consumer. Where this is unavailable the intended activities of the building and the estimated size of the loads can be used to formulate a demand profile. These PDFs can be formed using discrete time intervals of continuous probability densities. The case of using a discrete time interval allows the time interval to be matched to that of the market trading intervals for electricity as a commodity (e.g. Electricity futures or spot markets, or time periods of settlement).

Figure 4:
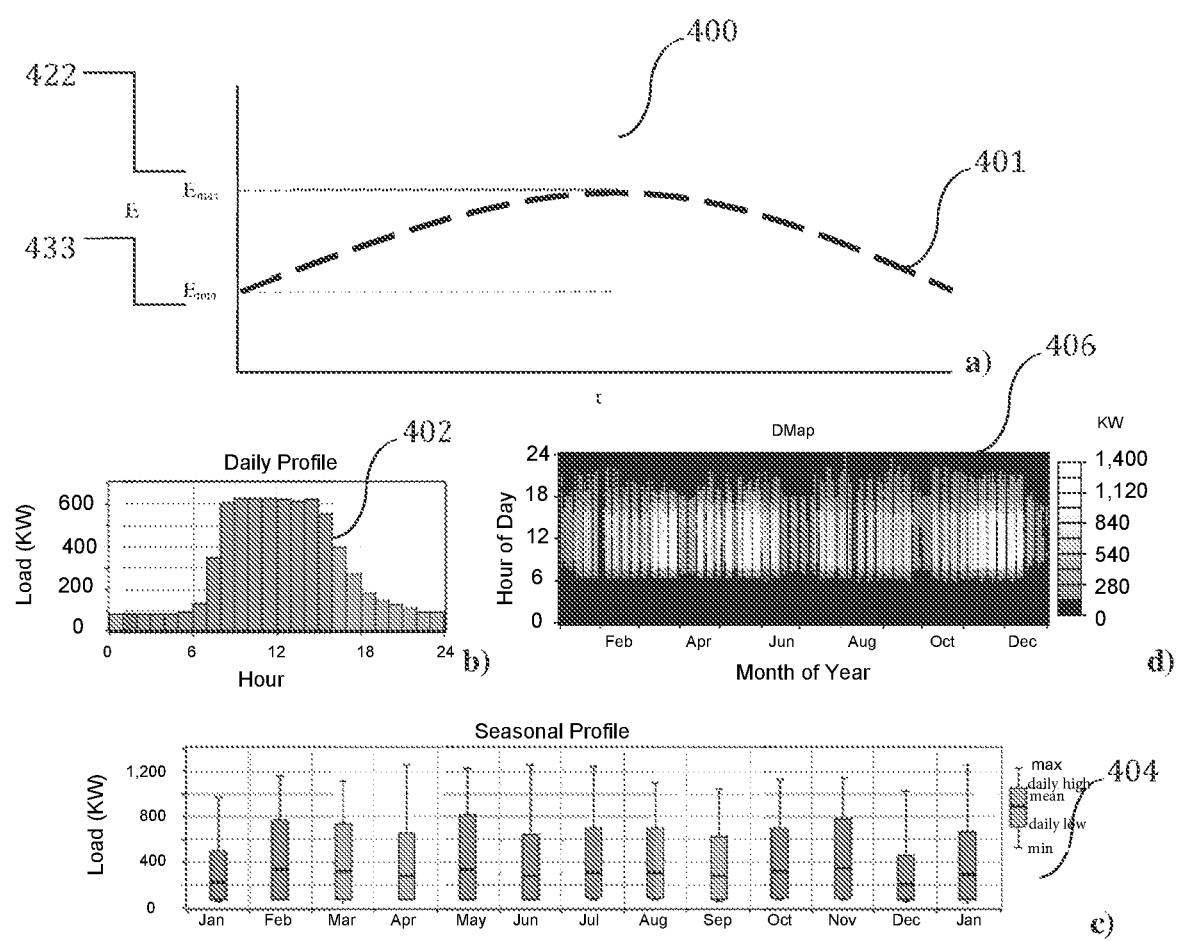
FIGS. 4 a)-d) shows a schematic drawings illustrating characteristics of an established consumer load profile, according to an example embodiment.

FIG. 4 a) shows a representative consumer load PDF 401. It is characterized in addition by the maximum amount 422 of electricity that can physically flow into the building at the distribution board or other electrical connection gear for the energy grid. This load profile rarely is zero given that the building consumes some electricity at all times, hence the minimum amount 433 of electricity indicated in FIG. 4 a). FIG. 4 b) shows a measured average daily profile 402 of energy of a building, FIG. 4 c) is the annual statistical variation chart 404 of the load profile, and FIG. 4 d) is a map 406 of the annual load profile over one year. In FIG. 4 d) the horizontal axis is the day of the year and the vertical axis is the hour of the day. The scale bar represents the amount of energy consumed in the building.

By obtaining the data that reflects the profile of demand of a building, a PDF can be formed for that consumer load demand. When the constraint the particular consumer has requested is added to reflect that the load must be supplied with a specific quantitative amount of variable energy from the generating facilities, an expectation value may be computed by associating both PDFs of the allocated resources 120 of 100 toward the constraint of the load, and the PDF of the consumer load demand. As such, a forward-looking probability density function allows the probability of a specific consumer constraint requirement to be quantitatively evaluated as a numerical value or strength as an expectation value or probability.

Statistics of Supply Modes Considering Supply and Demand Profiles, and Supply Profile Simulations Formulation of the constraints from which to assess the forward looking probability of meeting demands are determined from qualification on the manner in which the yield from intermittent generating facilities 100 are provided to satisfy the portion of the consumer load demand. There are various ways in which the amount of intermittent generation yield is provided for within the consumer load demand that has priority to the renewable resource. Each quantity is considered as a constraint on the provision of resources to each individual consumer load demand, and a consumer load demand moreover may be associated with more than one such quantified constraint. For example, determination of statistics of priority guarantees may include one or more of:
  a. Renewable penetration level
  b. Percentages of blended renewable energy
  c. Correlation to an energy supply pool or secondary generator resource
  d. Total amount of energy provided (e.g. 10 kWh)

A renewable penetration level measures the amount of energy providing to the load during the period the renewable resource provides maximum output and considering the amount of demand during the associated period of time. A percentage of blended renewable energy is a normalized amount of total renewable energy integrated through the period of time it provides to a specific load, divided by the integral of the load demand over the associated period of time. This percentage may refer to a plurality of loads or an individual one, or to a plurality of generating facilities or to an individual one. A correlation value to a secondary supply resource refers to the amount of renewable or intermittent energy provided during a time as associated with a correlation measurement of that supply level or amount with the secondary resource. This secondary resource could be evaluated qualitatively by its relative availability, its demand and supply level, or a price linked to the physical availability of the resource. A total amount of energy provided refers to a specific absolute yield of energy over a particular period of time. For example, a total amount of energy to be provided may be 10 units of energy from the intermittent resource each month.

The classifications of constraints is to be associated with each consumer load demand in descending subsets, and assessed against the total probabilistic generating capacity assuming the aggregation of generating facilities. The broadest classification is the consumer load priority, followed by various quantities for subsets as described above. All of the quantified constraints are assessed to determine a probability of satisfying all constraints considering the probabilistic generation capacity available. In an example embodiment a maximum, minimum, and average of the statistical generating capacity available is also preferably implemented so as to assess a potential amount of resource available to supply the consumer load demand constraints, as described above with reference to FIGS. 2 and 3.

Wholesale Supply and Demand Integration

In FIG. 5 the case of a dual supply system which incorporates a financial market is shown. Consumer load demand L can be supplied by physically available intermittent solar energy from the generating facilities G, and a wholesale pool P. The energy may be supplied to the loads L through a wholesale pool P while any constraint that requires energy to be derived through generating facilities G must be computed for by an allocation and auditing systems and described herein. As can be understood by a person skilled in the art, generating facilities G are long the price of the wholesale market P when the secondary supply resource takes the form of a wholesale energy market, and the loads L that are being supplied to at specified fixed pricing are short to the wholesale market P when the secondary supply resource takes the form of a wholesale energy market.

FIG. 6 shows actual wholesale energy date of a particular energy market as described in detail above.

Variations in the supply and demand of this market reflect a profile of an energy market, and can be considered to be represented quantitatively by both a discrete or continuous Probability Distribution Function (PDF). The particular wholesale market data displays a higher energy demand and thus higher energy price during daytime.

FIG. 7 illustrates a method of establishing an energy offset through generating facilities G to loads L as represented by a supply scenario as presented in FIG. 6. This has been described above and also in Singapore patent Application no. 102014068830, the contents of which are incorporated here by reference.

Exposure to Energy Pool Supply and Demand

FIG. 8 shows a schematic drawing illustrating the peak energy offset supply scenario wherein the base load energy derived from the wholesale energy pool is passed to the consumer and the supply load is decoupled from the wholesale market volatility from correlation to the periods of peak energy demand by supply of photovoltaic energy under an optimized renewable penetration scenario in an example embodiment; where FIG. 8 a) illustrates an assumed load demand profile 800, FIG. 8 b) illustrates a probability density distribution 802 of aggregated generation resources 100 or dedicated resources 120 (compare FIG. 1), FIG. 8c) is the modified load profile 804 incorporating various assumed PDFs of the dedicated generating facilities 120, i.e. the modified demand that is to be derived from the wholesale energy pool. FIG. 8d) illustrates a characteristic wholesale pool demand profile 806, showing correlation of peak demand 808 to the supply profile of the aggregated intermittent energy resources (compare probability density distribution 802 of aggregated generation resources in FIG. 8 b). As will be appreciated by a person skilled in the art, the wholesale pool pricing will substantially mirror the wholesale pool demand profile 806, meaning that the exposure of the load to the energy pool supply is advantageously reduced during periods in which the purchase price of energy from the wholesale pool market is expected to be higher than during other periods, e.g. during off-peak periods.

FIG. 6 shows an illustration of an energy pool supply and demand level and associated pricing fluctuations in the said energy pool due to the changes in demand and supply. In this case, a daytime correlation can be found while both demand and prices for energy rise in the pool. As a secondary generation source to fulfill those consumer load demand requirements which cannot be supplied for from only the intermittent generating facilities, the pool may comprise the secondary supply resource.

In such a case, the consumer load demand for electricity can be directly supplied by the wholesale pool while the intermittent energy generation is blended into their account through metering allocation and assignment of rights, as shown in FIG. 5 at arrow C. Through this relationship, any constraints are formed, and audits are implemented to verify they are met. Intermittent generation may still be provided directly to the pool at arrow A of FIG. 5.

FIG. 5 shows the arrangement of the generation (labeled G), energy pool (labeled P), and the consumer supply loads (labeled L). Between the meter readings of the loads, the readings at the meters of the generators are associated. Auditing of all metering is performed as described within this document. In consideration of the energy products supply constraints; the statistics of the energy pool can also be accounted for when creating a structured energy product. Such products are described below, wherein the statistics of the energy pool are described here.

Specification of Energy Supply Product Classes

Formulation of the energy supply components to energy consumers associated to the consumer load demand profiles and consumer constraints can take into account the available energy that is generated and represented by the PDF of the aggregated generating facilities over time. New systems that are installed will be added into the PDF so that it accurately represents to amount of energy that is statistically available for supply to consumers.

The remainder of the consumers energy demand can be made up with a secondary source of energy if it is not possible to make all of it from the intermittent sources. The secondary source may be an alternative generator that uses fuel, or could be a financial market such as a spot market or a futures market.

As a first formation of supply constraints formed for electricity supply, a particular value of supply from intermittent generators can be derived through comparison of the time profiles of generation and demand consumption on both a forward-looking basis and a look-back basis. Minimum quantities may then characterize the supply to the load from the intermittent resources, for example, those minimum levels may be the absolute percentage of intermittent energy that makes up the total consumption at the load, the cross correlation values between the intermittent generator time profiles and the load consumption time profiles, a maximum penetration level of the intermittent energy resources to the load demand, or a relative determination of the generation profile characteristic to the load profile characteristic over a period of time (for example, normally a day).

An additional formation of supply may be implemented wherein a dedicated intermittent resource to a particular load is specified. For example, this may be 2 dedicated intermittent generators as installed on the power grid network, and one quarter of the power from a third generator. Thereafter, the load is provided for by utilizing the dedicated resource to that load while otherwise making up for any shortfall in supply to the load or loads by deriving it through a secondary source, such as a wholesale energy pool. In such a scenario, the intermittent generation can at least make up as much of the demand as correlated based on the time profiles of the energy sources and time profiles of the load demands.

Another supply mode can involve obtaining a higher amount of intermittent generation that required by the loads at a particular time, such that the penetration ratio of the generator is well over the load demand. In such a scenario, the excess energy that is generated above the supply can then be sold into time slots in the evening using products that exchange power or utilize futures contracts. The excess energy can be traded forward into time period that the intermittent generation was not able to physically supply to the load demands. In this scenario, large percentages of intermittent energy can comprise the load supply with no requirements of energy storage systems. The target will be such that 100% of the load demand is made up through intermittent generation. In this scenario, the load is set as priority, and the dedicated intermittent resources established to supply to the load are sized such that the total generation is able to total supply. The excess at periods of time when the load demand is below the intermittent generators supply is then trades into periods of time when the load demand is above the intermittent generators supply. In this scenario, on a look-back basis, the formation of 100% supply to the loads can be validated while any remaining energy of the intermittent generators may then be blended into low priority loads.

Given the above energy management systems and physical consolidation mechanisms, and access to resources including physical generating facilities 100, 120, 102 of an intermittent nature, and secondary resources such as a secondary generator or a wholesale or futures energy market, various product packages can be implemented with particular features. The features of the product packages maybe represented in the form of a quantitative constraint, and the supply method and audit method for verifying of any required constraints that is described within this document may be used to implement a supply and audit methodology over a period of time.

Products features may be formed by reflecting quantities and features. A list of particular features of a particular consumer load are described here below, while they may then later be grouped into classification sets as they are provided to energy consumers. As energy consumers accept the energy supply quantities, the procedure of forming the supply constraints as sets of classification and PDFs of the consumer loads is established.

Quantities or features that are introduced as classifications or characterisations of the supply mode to the target consumption load are described one by one as follows:

1. Priority to Solar
   a. Field: Binary
   b. Values: Yes or No
   c. Description: Priority means a constraint that prioritizes access of the consumer load demand to the generating facilities as quantified by a constraint. This would take the form where the generating facilities are solar energy generators as a guaranteed amount of solar electricity provisions for supply to the consumer. Where no priority is required by the consumer, the consumer load demand profile requires no guaranteed amount of solar provided.
2. Minimum solar percentage:
   a. Expressed as X % of consumer load demand derived from the total intermittent supply to the load divided by the total load consumption over a period of time
   b. Description: Minimum percent solar requested in absolute terms with respect to the consumer load demand profile.
3. Penetration Ratio:
   a. Expressed as a percentage X % of a consumer load demand profile as a ratio of the maximum demand to maximum output from generating facilities.
      Description: Target ratio as correlation of load profile to solar power profile.
4. Optimised Penetration ratio as a correlation coefficient:
   a. SE engineer optimised the penetration ratio accounting for wholesale volatility.
   b. Description: The penetration ratio is derived to form an optimal level of intermittent energy that reduces the exposure of the load demand profile to a secondary resource such as a wholesale energy pool as presented in FIG. 6. The correlation of the load to the wholesale energy pool is evaluated assuming a dedicated amount of intermittent energy generators supplying to the load. In this scenario, die dedicated resources are then implemented to reduce the correlation of the time profile of the loads to the wholesale market time profile.

Specific product classification can be formed using such an implementation. For example, energy consumers' loads can be provided for by a fixed amount of intermittent generation and the remaining energy from a wholesale energy market. When the utility introduced the above options, the energy loads may get a variety of supply features satisfying various forms of classifications reflecting the quantity of intermittent energy that is supplied to them in respect of alternative resources used, and their own demand consumption.

Pass Through CFD or Transfer Pricing Between Long and Short Exposure

The supply contract in example embodiments will allocate renewable energy to the loads from the generating facilities. The supplier can be expected to invariably be purchasing additional energy from a second source due to the intermittency of the generating facilities. FIG. 5 illustrates the relationship between the generating facilities (G), the consumer loads (L) and the energy pool (P). The loads can be supplied from the energy pool, while the generation is distributed into the energy pool. In such a scenario, the fluctuations in the supply and demand in the energy pool which also faces the forces of various other generation sources which input energy to this pool will affect the pricing. To remedy any variations in the prices of the generators, transfer pricing or purchases of the renewable energy rights can be performed between the generator G and the supplier to the loads L. This allows the generators to incorporate pricing from an off-take to the consumer load rather than from a volatile market price such as a wholesale market.

In addition to the energy pool, secondary supply can also be obtained in the futures market if an electricity futures market is providing for future delivery. This contract will be settled off of actual delivery. Various securities contracts can be used to lock in the pricing as well, including HSFO, Brent, or other energy linked securities that are traded in the market. This allows for a variety of resources to be used to form a second supply source to the customer's loads.

Auditing and Reporting Methodology

For the matter of auditing the energy supply, an operation center is employed in example embodiments to collect both data from the generators and data from the supply loads. The flows of energy on the power network associated with the plurality of generators and the plurality of loads will be measured using a suitable revenue grade energy meter. This information is collected at a central server or other information system for audit. An example of a central server system that can be used to implement such an operation center can be found in Singapore patent application no. 10201502972V, the contents of which are hereby incorporated by reference.

The audit will compare the actual generation over the time periods of supply to the loads, and the actual load demand over those periods of time, and verify the levels of renewable energy that are provided to those loads.

Those levels are assessed against the constraints that have been applied for those consumer loads. The total generation and consumption, renewable penetration levels, total percentage blend, and other numerical information representing the amount of renewable energy from intermittent sources that was allocated to those consumer loads is computed and stored on the server.

As a matter of performing a transparent audit, those consumers can obtain the information from the audit through a platform and may publish that information. Consumers may log into their accounts and publish the total renewable energy consumption information through an Application Programmer Interface (API) so that the data can be fed out to their own IP address. On an ongoing basis, the consumer may publish this information via the internet to their site. The publishing platform will advantageously be equipped such that those consumers can also publish their audit information to social media platforms, such as Twitter, Facebook, Google plus, or other platforms. Their information can also be published through to a dedicated publishing platform where all consumer information can be voluntarily published.

The building owners who contribute the space from their premises to provide for generation facility installations can also publish the total generation statistics of supply measured from the generation facilities at their premises. In this case, the amount of clean energy that these property owners contribute is publishable as an audit in terms of only the generation of electricity information. This can be also provided via API to the internet so that the information can be posted through an internet protocol (IP) address of the property owner's choice, or on social media etc. as stated above. In this sense, the total audit provides that all the generation and consumption data is made available for voluntary publication by both the consumers and producers of the energy. The result of the audit in terms of the validation of supply constrains can also be made available to the energy consumers.

Reconciliation of Supply on Audit

FIG. 9 shows a diagram illustrating the relationship between the supply allocation and the audit in example embodiments. The supply allocation 900 is forward looking to determine the allocation of resources which satisfy the particular constraints of the loads to the delivery at a particular time. In FIG. 9, the settlement takes place at time t and the settlements are then measured in real time. This time t could also be embodied by a time period, such as a month, or other periods in that the measurement can be expressed as a representative quantity over that particular time bin. The supply constraints are specified given the particular time period chosen as well.

The audit 902 is a backward looking process that determined the measured delivery of any specific constraint by reviewing the actual delivery of energy from the intermittent resources, and compares those to the measured supply allocation. Where all constraints are satisfied, no reconciliation of supply is required. Where the audit uncovers a divergence between the supply constraints and the actual measured energy on a look-back audit, a reconciliation method is then implemented.

Reconciliation 904 involves obtaining additional energy that was not set aside within those resources that were allocated to priority loads. This will reduce the amount of resources allocated to the no-priority loads.

Reconciliation is completed to make up for all shortfalls on constraints to the limit at which the no-priority loads receive no allocations of energy from the intermittent resources.

Wherein there is still a shortfall in the energy, additional installation of generating facilities are provided for such that the shortfalls are met. As an ongoing process, the balance of energy distribution allocated between those priority loads which have associated constraints and those no-priority loads which have no associated constraints is assessed over time on an ongoing basis. As new constraints are provided for and new generating facilities are installed, the balance determined from the PDF such as the PDF 222 as described above with reference to FIG. 2 can be adjusted such that a firm commitment in terms of a high probability of satisfying the constraints through measured auditing process is larger than a particular set probability (e.g. 99%, 99.9%, 99.999%, . . . ) depending on the amount of demand in the market for intermittent renewable energy resources.

Summary of Audit and Supply Method as a Process According to One Embodiment

FIG. 10 shows a flowchart 1000 illustrating the process of forming the statistical supply system and an auditing methodology for an association of aggregated generating facilities and a plurality of loads according to one embodiment, and comprises the following steps:

Establishing the consumer loads requirements and obtaining or adjusting the associated constraints and computing the PDF of the consumer load demands and the intermittent generating facility resources and computing the PDF of the generation supply; 1002.

Dividing the consumer loads into priority and no-priority consumers and forming classifications of constraints and subsets of loads associated with one or more similar quantitative constraints; 1004.

Computing the probability of supply to the priority loads and establishing that to a high probability (eg. 99.9%, 99.99%, 99.999%, etc.) those loads will obtain the amounts of renewable energy from the intermittent supply resources, and that all other constraints imposed through contract are obtained, on a forward looking basis; 1006.

As an option, adjusting the establishment of priority and no-priority on an ongoing basis depending on the availability of supply (as computed at 1002), 1008.

As an option, adjusting the establishment of new generating facilities based on the supply (as computed at 1002); 1010.

Delivery of supply to consumer loads at time t; 1012

Auditing the actual generation of electricity measured against the actual consumption of energy measured as a cross correlation of the time profiles of the aggregate intermittent generating facilities dedicated to provide to particular loads constraints against the time profiles of the particular loads, and allocating any remaining amount to no-priority loads; 1014.

In the event of a violation of a constrain on a consumer load, making up for the said violation by allocating additional provisions to the consumer and reconciling the supply scenario on a forward looking basis while next establishing the consumer loads requirements and constraints (see 1002); 1016.

Providing for publication of various measured amounts or variables representing the supply levels and the validation of consumer load supply constraints from audit to public communication channels; 1018.

Implementing process steps 1002-1018 on an on-going basis (e.g. Monthly, daily, on establishing new generating facilities and new consumer loads, every minute, etc.) while adjusting for the amounts of dedicated intermittent resources established for supply to particular load constraints based on the measurement outcomes of process step 1014; 1020

Information Systems Technology Architecture in an Example Embodiment

The server architecture is to be established to preferably handle operation with a large set of solar generators scattered across a specific location/region, such as across a city, the country or even the world as installed in multiple locations. Or, this same architecture may be implemented multiple times per city and an allowance for individual servers to communicate with each other may be added such that the information from various servers and/or various e.g. cities can be compared and published by users, if they are granted access. All of the connections into the server are made using the internet in an example implementation and encrypted in some form to keep the data secure. The main aspects that the architecture solves preferably include.

1) The ability to constantly receive status data from our generators.
2) Have the ability to control or change how the generator operates.
3) Generate audits and reports on the energy output FIG. 11 shows the basic overview of the connections with the server 1111 incorporating the elements which may be implemented to allow for computation of satisfaction of the constraints provided to or by consumers, a method of user log ins, publishing platform, as well as a communication link for an AC power grid network administrator and a power system operator (PSO). This embodiment of an information technology architecture provides networking elements for assistance in operating and reading in information from energy metering equipment.

The control unit e.g. 1186 element is described here. The control units e.g. 1186 include programmable logic controllers (PLC) designed to control and maintain a solar generating facility e.g. 1188 system. There may be installed one or many such PLC elements in a particular solar generating facilities e.g. 1188 location. The control units e.g. 1186 are coupled to sensors (not shown) to provide the central server 1111 with information about power output, electricity interference, sun exposure, and to indicate any equipment failure. This information is sent from the control units e.g. 1186 (which may also be referred to as "monitoring units" herein) to a router e.g. 1171 with an encrypted virtual private network (VPN) e.g. 1172 connection to the server 1111, and directly into the server's 1111 database 1104. If there are problems with the connection, the control unit e.g. 1186 stores the status updates until a connection is made, and then uploads the queued status updates.

While connected to the structured query language (SQL) server 1111 in this embodiment, the control unit e.g. 1186 also checks if there are any remote commands that need to be executed, and applies them in the order they were sent to the database 1104, or by the assigned time signature, or by an assigned priority. Assignment of priority and/or the timing schedule of routines will take precedence over implementation of routines by order that they were sent to the database 1104, in this embodiment.

The server element 1111 is described here. The central core of the server 1111 revolves around a SQL database 1104. There are two connections for obtaining information that provide most of the SQL database 1104 with information: The control units e.g. 1186, the sensors, the metering systems (not shown) associated with the generating facilities e.g. 1188 that produce electricity, and energy market customer data which may be received by reading consumer load data (see e.g. 1114) from a secondary service provider 1143 or by directly reading the energy meters into the database 1104. Using this detailed information, the server 1111 is advantageously able to generate all of its other data like audits, billing, etc. Computations of audits will be done according to the time periods of which information received is represented, and especially in regard to the reconciliation and auditing procedures according to example embodiments described herein, the database 1104 will assist in indexing information representing the actual flows of energy in a look-back scenario and verifying that constraints that have been provided to consumers are met without double counting of any energy generation form intermittent supply sources to meet such constraints.

The server 1111 hosts a VPN server 1102 to receive connections from all of its control units e.g. 1186. The server 1111 also hosts a web server 1115 to display information about specific generators or the system as a whole. Energy customers 1163 can log in and see the status of the solar energy that was produced for them.

They may select options to publish their consumption information through various application programmer interfaces (APIs) to addresses on the internet 1101 such as their home page, and may also select options to publish their energy usage and audits to social media sites like twitter, Facebook, linked in or other locations.

The list of social media sites is not an exhaustive list and other information sharing locations can be used.

Consumers who provide roof-space or otherwise provide for generating facilities to be located on their land can choose to publish the generation data from those associated generating facilities through APIs as well, and to social media platforms, and as such they may present their own clean energy contribution to a particular power grid. Power operators or power grid administrators 1162 can log in and see a particular solar generator's output and have the ability to shut it down in case of emergency. Company staffs who are in charge of operating solar energy infrastructure such as installers 1161 can also log in to see the status on particular solar generators, send commands, and also fill in detailed information when installing a new solar generator.

Another connection that the server 1111 receives in this embodiment is from the energy market customer transaction server 1143. This connection can receive transactions about customers that are entering or terminating energy contracts with the utility company. The energy market representative may also send updates regularly about customer energy usage (see e.g. 1114) through this connection. The solar utility can correlate this information with the energy output (e.g. 1112) to produce an audit on how much each customer's energy came from the clean energy generating facilities e.g. 1188. The billing component 1113 on the server 1111 gathers the audits to generate a bill for each customer with detailed information on when they received our energy.

The server 1111 also makes a secure connection with the energy market 1144 to send information about the energy each solar generator is generating to the energy pool. The total output reported should closely match the output on each solar generator's meter. It can also be used to ensure the utility is not overbilling or under billing.

Where the security of a connection to a particular identity is required, such as where a power system operator should be the only entity which may send a dispatching command, or a power grid network administrator is the only entity who may send an isolation request, the exchange of certificates may be implemented to secure the communication. There are multiple layers of security in place in an embodiment to preferably ensure the security of the system. The connection used between different entities and the server will be secured with secure sockets layer (SSL). This connection ensures the server is communicating only with the entity's system and protects from eavesdropping on the internet. The login and password will be required to gain access.

Lastly, we will store a whitelist of the accepted internet IP ranges that are allowed with each user. Access will only be given to users with the correct login, password, and accepted IP. The IP whitelist will be primarily used for entities that can send commands to our system. These entities will need a static IP and provide IP ranges for systems that will connect to the server. These certificates can be updated time to time to ensure they are not interfered with, and they will be implemented at both the server side of the utility and the computer of the entity who is communicating to the utilities server.

Figure 12:
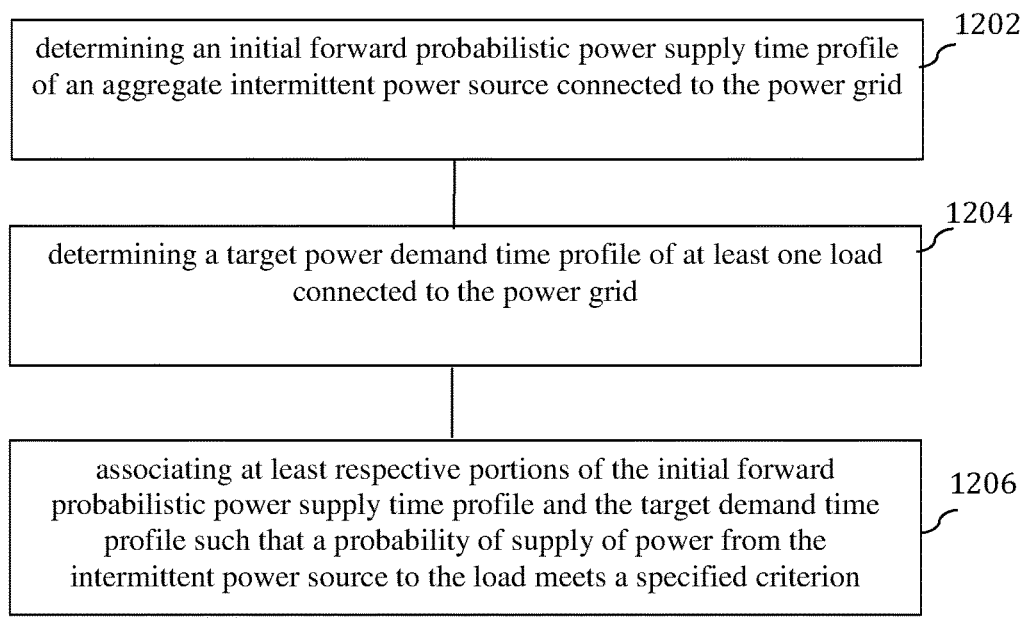
FIG. 12 shows a flowchart illustrating a method of supplying power in a power grid according to an example embodiment.

FIG. 12 shows a flowchart 1200 illustrating a method of supplying power in a power grid according to an example embodiment. At step 1202, an initial forward probabilistic power supply time profile of an aggregate intermittent power source connected to the power grid is determined. At step 1204, a target power demand time profile of at least one load connected to the power grid is determined. At step 1206, at least respective portions of the initial forward probabilistic power supply time profile and the target demand time profile are associated such that a probability of supply of power from the intermittent power source to the load meets a specified criterion.

The method may further comprise generating an updated forward probabilistic power supply profile based on the associated portion of the initial forward probabilistic power supply time profile being dedicated to the load.

The method may further comprise outputting a forward probabilistic intermittent power supply contribution for the load based on the associated at least respective portions of the initial forward probabilistic power supply time profile and the target demand time profile.

The probability may be calculated based on an expectation value of a cross-correlation of the initial forward probabilistic power supply time profile and the target demand time profile.

Associating the at least respective portions of the forward probabilistic power supply profile and the target demand time profile may be based on a priority level of the load, the method further comprising dedicating a subset of intermittent power generating facilities of the aggregated intermittent power source to the supply for a highest priority load and generating the updated forward probabilistic power supply profile based on excluding the subset.

The method may further comprise determining whether a measured supply of power from the aggregate intermittent power source to the load meets the specified criterion and generating an actual intermittent power supply contribution for the loads based on the measured supply of power.

The method may further comprise validating one or more consumer constraints associated with the loads.

The aggregate intermittent power source may comprise one or more intermittent power generating facilities connected to the power grid.

The specified criterion may comprise one or more of a group consisting of at least one percentage blend, at least one penetration ratio, at least one cross-correlation, and at least one correlation among a secondary source and the load.

Figure 13:
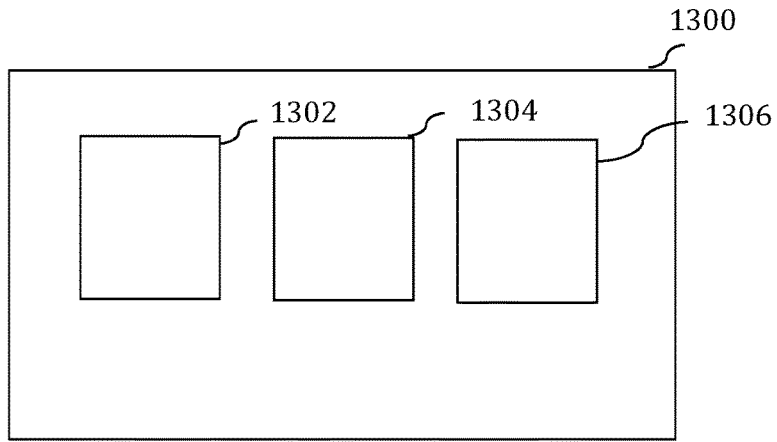
FIG. 13 shows a schematic drawing illustrating a system for supplying power in a power grid.

FIG. 13 shows a schematic drawing illustrating a system 1300 for supplying power in a power grid, the system 1300 comprising means 1302 for determining an initial forward probabilistic power supply time profile of an aggregate intermittent power source connected to the power grid; means 1304 for determining a target power demand time profile of at least one load connected to the power grid; and means 1306 for associating at least respective portions of the initial forward probabilistic power supply time profile and the target demand time profile such that a probability of supply of power from the intermittent power source to the load meets a specified criterion.

The system may further comprise means for generating an updated forward probabilistic power supply profile based on the associated portion of the initial forward probabilistic power supply time profile being dedicated to the load.

The system may further comprise means for outputting a forward probabilistic intermittent power supply contribution for the load based on the associated at least respective portions of the initial forward probabilistic power supply time profile and the target demand time profile.

The probability may be calculated based on an expectation value of a cross-correlation of the initial forward probabilistic power supply time profile and the target demand time profile.

Associating the at least respective portions of the forward probabilistic power supply profile and the target demand time profile may be based on a priority level of the load, the method further comprising dedicating a subset of intermittent power generating facilities of the aggregated intermittent power source to the supply for a highest priority load and generating the updated forward probabilistic power supply profile based on excluding the subset.

The system may further comprise means for determining whether a measured supply of power from the aggregate intermittent power source to the load meets the specified criterion and generating an actual intermittent power supply contribution for the loads based on the measured supply of power.

The system may further comprise means for validating one or more consumer constraints associated with the loads.

The aggregate intermittent power source may comprise one or more intermittent power generating facilities connected to the power grid.

The specified criterion may comprise one or more of a group consisting of at least one percentage blend, at least one penetration ratio, at least one cross-correlation, and at least one correlation among a secondary source and the load.

Figure 14:
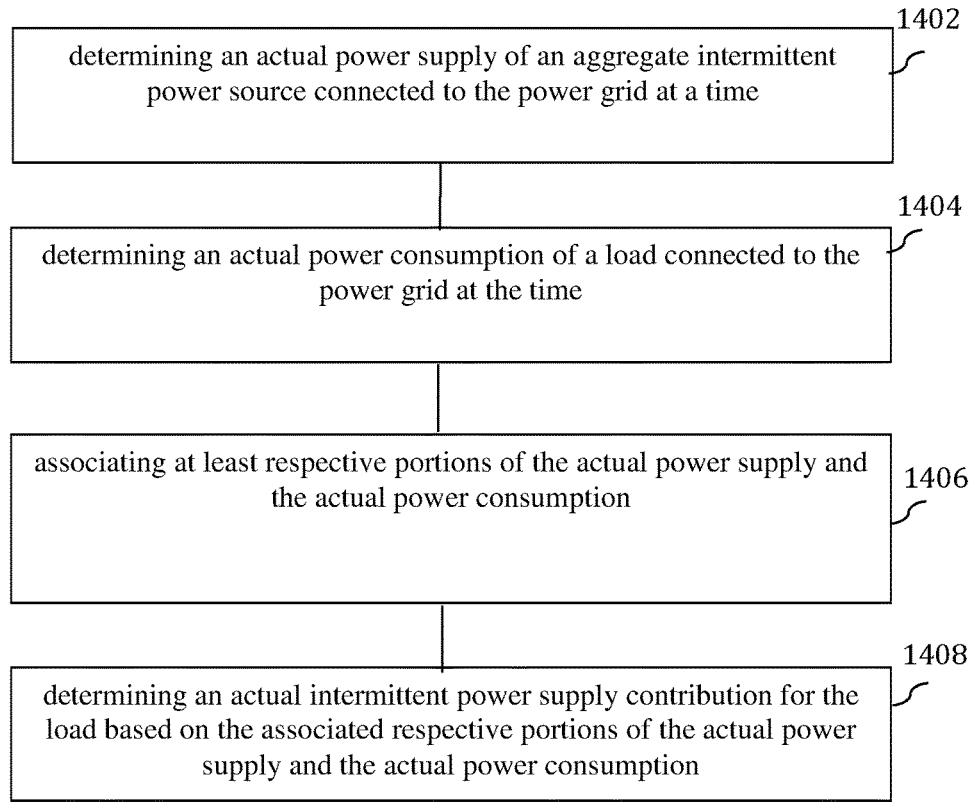
FIG. 14 shows a flowchart illustrating a method of consolidating power injection and consumption in a power grid according to an example embodiment.

FIG. 14 shows a flowchart 1400 illustrating a method of consolidating power injection and consumption in a power grid according to an example embodiment. At step 1402, an actual power supply of an aggregate intermittent power source connected to the power grid at a time is determined. At step 1404, an actual power consumption of a load connected to the power grid at the time; is determined. At step 1406, at least respective portions of the actual power supply and the actual power consumption are associated. At step 1408, an actual intermittent power supply contribution for the load based on the associated respective portions of the actual power supply and the actual power consumption is determined.

The method may further comprise determining whether the determined actual intermittent power supply contribution from the aggregate intermittent power source to the load meets a specified criterion.

The method may further comprise updating a forward probabilistic intermittent power supply contribution for the load based on whether the actual supply of power from the aggregate intermittent power source to the load meets the specified criterion.

The specified criterion may comprise one or more of a group consisting of at least one percentage blend, at least one penetration ratio, at least one cross-correlation, and at least one correlation among a secondary source and the load.

Associating the at least respective portions of the actual power supply and the actual power consumption may be based on a priority level of the load.

The method may further comprise associating respective portions of the actual power supply and the actual power consumption of a highest priority level load, prior to associating respective portions of a remaining actual power supply and the actual power consumption of a lower priority level load.

The method may further comprise validating one or more consumer constraints associated with the load.

The aggregate intermittent power source may comprise one or more intermittent power generating facilities connected to the power grid.

Figure 15:
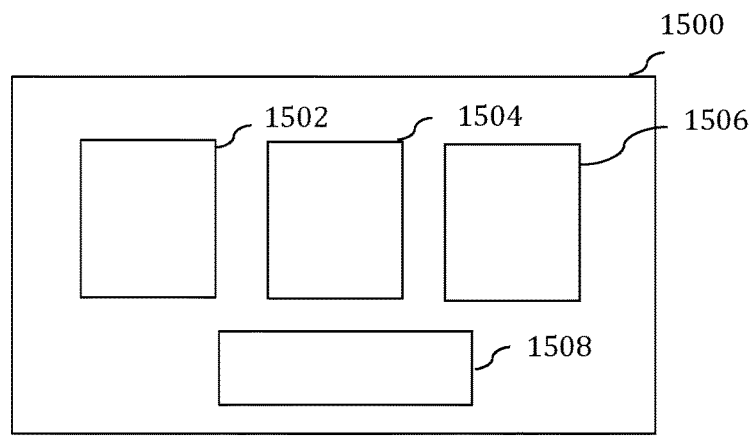
FIG. 15 shows a schematic diagram illustrating a system for consolidating power injection and consumption in a power grid.

FIG. 15 shows a schematic diagram illustrating a system 1500 for consolidating power injection and consumption in a power grid, the system 1500 comprising means 1502 for determining an actual power supply of an aggregate intermittent power source connected to the power grid at a time; means 1504 for determining an actual power consumption of a load connected to the power grid at the time; means 1506 for associating at least respective portions of the actual power supply and the actual power consumption; and means 1508 for determining an actual intermittent power supply contribution for the load based on the associated respective portions of the actual power supply and the actual power consumption.

The system may further comprise means for determining whether the determined actual intermittent power supply contribution from the aggregate intermittent power source to the load meets a specified criterion.

The system may further comprise means for updating a forward probabilistic intermittent power supply contribution for the load based on whether the actual supply of power from the aggregate intermittent power source to the load meets the specified criterion.

The specified criterion may comprise one or more of a group consisting of at least one percentage blend, at least one penetration ratio, at least one cross-correlation, and at least one correlation among a secondary source and the load.

Associating the at least respective portions of the actual power supply and the actual power consumption may be based on a priority level of the load.

The system may further comprise means for associating respective portions of the actual power supply and the actual power consumption of a highest priority level load, prior to associating respective portions of a remaining actual power supply and the actual power consumption of a lower priority level load.

The system may further comprise means for validating one or more consumer constraints associated with the load.

The aggregate intermittent power source may comprise one or more intermittent power generating facilities connected to the power grid.

Figure 16:
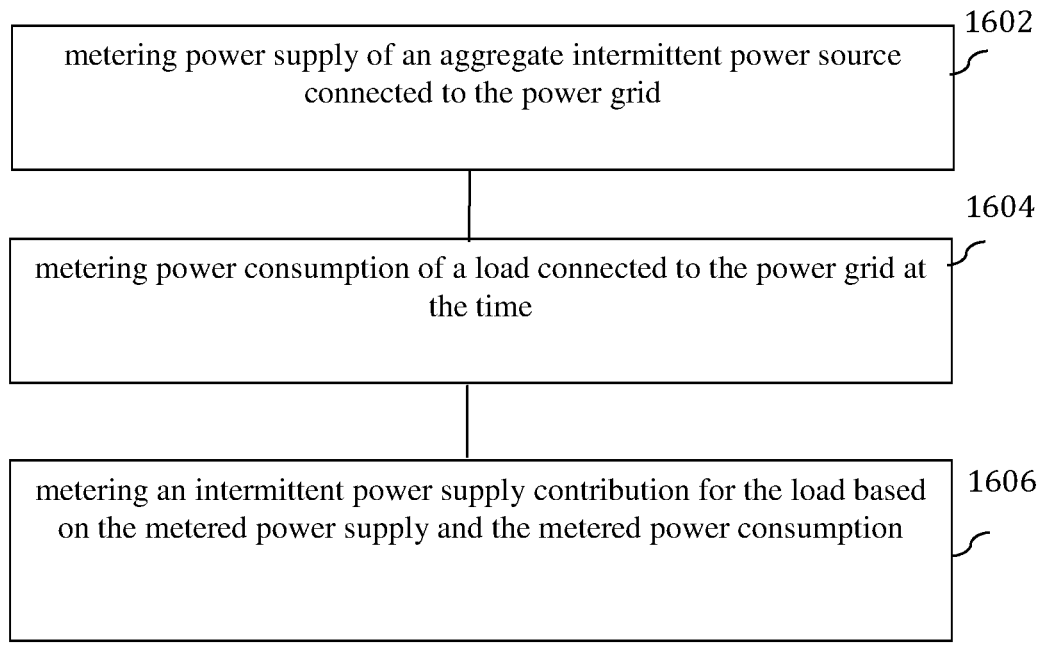
FIG. 16 shows a schematic diagram illustrating a metering system for a power grid.

FIG. 16 shows a schematic diagram illustrating a metering system 1600 for a power grid comprising means 1602 for metering power supply of an aggregate intermittent power source connected to the power grid; means 1604 for metering power consumption of a load connected to the power grid at the time; and means 1606 for metering an intermittent power supply contribution for the load based on the metered power supply and the metered power consumption.

The means for metering the intermittent power supply contribution may be configured to associate at least respective portions of the metered power supply and the metered power consumption.

The means for metering the intermittent power supply contribution may be configured to associate the respective portions of the metered power supply and the metered power consumption based on a priority level of the load.

The means for metering the intermittent power supply contribution may be configured to associate the respective portions of the metered power supply and the metered power consumption of a highest priority level load, prior to associating respective portions of a remaining portion of the metered power supply and the metered power consumption of a lower priority level load.

The system may further comprise means for determining whether the intermittent power supply contribution meets a specified criterion.

The system may further comprise means for updating a forward probabilistic intermittent power supply contribution for the load based on whether the intermittent power supply contribution meets the specified criterion.

The specified criterion may comprise one or more of a group consisting of at least one percentage blend, at least one penetration ratio, at least one cross-correlation, and at least one correlation among a secondary source and the load.

The system may further comprise means for validating one or more consumer constraints associated with the load.

The aggregate intermittent power source may comprise one or more intermittent power generating facilities connected to the power grid.

Figure 17:
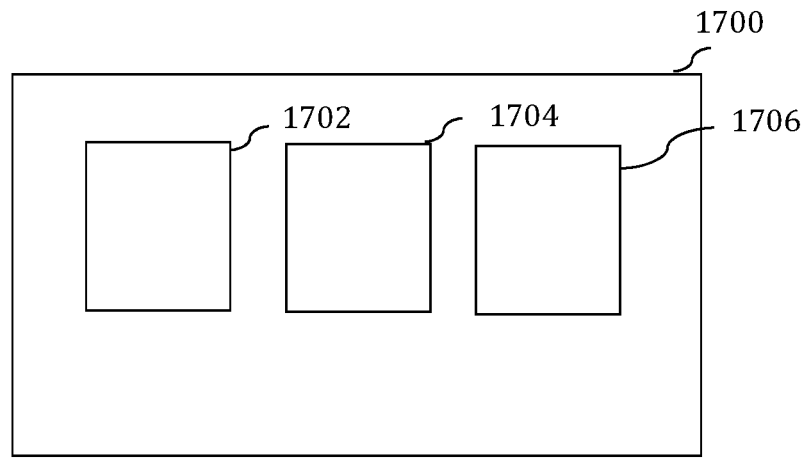
FIG. 17 shows a flowchart illustrating a metering method for a power grid according to an example embodiment.

FIG. 17 shows a flowchart 1700 illustrating a metering method for a power grid according to an example embodiment. At step 1702, power supply of an aggregate intermittent power source connected to the power grid is metered. At step 1704, power consumption of a load connected to the power grid at the time is metered. At step 1706, an intermittent power supply contribution for the load based on the metered power supply and the metered power consumption is metered.

The metering the intermittent power supply contribution may be configured to associate at least respective portions of the metered power supply and the metered power consumption.

The metering the intermittent power supply contribution may be configured to associate the respective portions of the metered power supply and the metered power consumption based on a priority level of the load.

The metering the intermittent power supply contribution may be configured to associate the respective portions of the metered power supply and the metered power consumption of a highest priority level load, prior to associating respective portions of a remaining portion of the metered power supply and the metered power consumption of a lower priority level load.

The method may further comprise determining whether the intermittent power supply contribution meets a specified criterion.

The method may further comprise updating a forward probabilistic intermittent power supply contribution for the load based on whether the intermittent power supply contribution meets the specified criterion.

The specified criterion may comprise one or more of a group consisting of at least one percentage blend, at least one penetration ratio, at least one cross-correlation, and at least one correlation among a secondary source and the load.

The method may further comprise validating one or more consumer constraints associated with the load.

The aggregate intermittent power source may comprise one or more intermittent power generating facilities connected to the power grid.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features, in particular any combination of features in the patent claims, even if the feature or combination of features is not explicitly specified in the patent claims or the present embodiments.

The invention claimed is:

1. A method of supplying power in a power grid, the method comprising:
   determining an initial forward probabilistic power supply time profile of an aggregate intermittent power source connected to the power grid;
   determining a target power demand time profile of at least one load connected to the power grid;
   creating a synthetic probability model of consumption;
   associating at least respective portions of the initial forward probabilistic power supply time profile and the target demand time profile such that a probability of supply of power from the intermittent power source to a load meets a specified criterion based on the synthetic probability model of consumption and comprising at least one of at least one percentage blend, at least one penetration ratio, and at least one correlation among a secondary source and the load;
   determining whether a measured supply of power from the aggregate intermittent power source to the load meets the specified criterion and generating an actual intermittent power supply contribution for the load based on the measured supply of power; and
   when a shortfall exists between the measured supply of power from the aggregate intermittent power source to the load and the specified criterion, reallocating resources allocated to at least one of low-priority loads or no-priority loads so that the reallocated resources can be utilized to make up the shortfall.

2. The method as claimed in claim 1, further comprising generating an updated forward probabilistic power supply profile based on the associated portion of the initial forward probabilistic power supply time profile being dedicated to the load.

3. The method as claimed in claim 1, her comprising outputting a forward probabilistic intermittent power supply contribution for the load based on the associated at least respective portions of the initial forward probabilistic power supply time profile and the target demand time profile.

4. The method as claimed in claim 1, wherein the probability is calculated based on an expectation value of a cross-correlation of the initial forward probabilistic power supply time profile and the target demand time profile.

5. The method as claimed in claim 1, wherein associating the at least respective portions of the forward probabilistic power supply profile and the target demand time profile is based on a priority level of the load, the method further comprising dedicating a subset of intermittent power generating facilities of the aggregated intermittent power source to the supply for a highest priority load and generating the updated forward probabilistic power supply profile based on excluding the subset.

6. The method as claimed in claim 1, further comprising validating one or more consumer constraints associated with the at least one load.

7. The method as claimed in claim 1, wherein the aggregate intermittent power source comprises one or more intermittent power generating facilities connected to the power grid.

8. The method as claimed in claim 1, wherein the specified criterion further comprises at least one cross-correlation among a secondary source and the load.

9. A system supplying power in a power grid, the system comprising:
   means for determining an initial forward probabilistic power supply time profile of an aggregate intermittent power source connected to the power grid;
   means for determining a target power demand time profile of at least one load connected to the power grid;
   means for creating a synthetic probability model of consumption,
   means for associating at least respective portions of the initial forward probabilistic power supply time profile and the target demand time profile such that a probability of supply of power from the intermittent power source to the load meets a specified criterion based on the synthetic probability model of consumption and comprising at least one of at least one percentage blend, at least one penetration ratio, and at least one correlation among a secondary source and the load;
   means for determining whether a measured supply of power from the aggregate intermittent power source to the load meets the specified criterion and generating an actual intermittent power supply contribution for the load based on the measured supply of power; and
   means for reallocating, when a shortfall exists between the measured supply of power from the aggregate intermittent power source to the load and the specified criterion, resources allocated to at least one of low-priority loads or no-priority loads so that the reallocated resources can be utilized to make up the shortfall.

10. The system as claimed in claim 9, further comprising means for generating an updated forward probabilistic power supply profile based on the associated portion of the initial forward probabilistic power supply time profile being dedicated to the load.

11. The system as claimed in claim 9, further comprising means for outputting a forward probabilistic intermittent power supply contribution for the load based on the associated at least respective portions of the initial forward probabilistic power supply time profile and the target demand time profile.

12. The system as claimed in claim 9, wherein the probability is calculated based on an expectation value of a cross-correlation of the initial forward probabilistic power supply time profile and the target demand time profile.

13. The system as claimed in claim 9, wherein associating the at least respective portions of the forward probabilistic power supply profile and the target demand time profile is based on a priority level of the load, the method further comprising dedicating a subset of intermittent power generating facilities of the aggregated intermittent power source to the supply for a highest priority load and generating the updated forward probabilistic power supply profile based on excluding the subset.

14. The system as claimed in claim 9, further comprising means for validating one or more consumer constraints associated with the at least one load.

15. The system as claimed in claim 9, wherein the aggregate intermittent power source comprises one or more intermittent power generating facilities connected to the power grid.

16. The system as claimed in claim 9, wherein the specified criterion further comprises at least one cross-correlation among a secondary source and the load.

* * * * *